(12) United States Patent
Masuda et al.

(10) Patent No.: US 8,705,111 B2
(45) Date of Patent: Apr. 22, 2014

(54) INKJET PRINTING APPARATUS AND PRINT DATA GENERATING METHOD

(75) Inventors: Satoshi Masuda, Yokohama (JP); Norihiro Kawatoko, Yokohama (JP); Hitoshi Nishikori, Inagi (JP); Osamu Iwasaki, Tokyo (JP); Tomoki Yamamuro, Kawasaki (JP); Atsuhiko Masuyama, Yokohama (JP); Fumiko Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 16 days.

(21) Appl. No.: 13/442,197

(22) Filed: Apr. 9, 2012

(65) Prior Publication Data

US 2012/0274949 A1    Nov. 1, 2012

(30) Foreign Application Priority Data

Apr. 27, 2011    (JP) ................. 2011-099989

(51) Int. Cl.
 *H04N 1/04* (2006.01)
(52) U.S. Cl.
 USPC ............. 358/1.2; 358/1.9; 358/1.16; 358/1.3

(58) Field of Classification Search
 USPC .................... 358/1.2, 1.9, 1.16, 1.3
 See application file for complete search history.

(56) References Cited

U.S. PATENT DOCUMENTS

| | | | |
|---|---|---|---|
| 6,033,055 A * | 3/2000 | Nagoshi et al. ................. | 347/43 |
| 6,755,506 B2 * | 6/2004 | Nishikori et al. ............... | 347/40 |
| 7,249,815 B2 | 7/2007 | Keller et al. | |
| 7,377,619 B2 * | 5/2008 | Takahashi et al. .............. | 347/43 |
| 2002/0113830 A1 * | 8/2002 | Mantell ............................ | 347/6 |
| 2009/0161130 A1 * | 6/2009 | Mabuchi et al. ................ | 358/1.9 |

* cited by examiner

*Primary Examiner* — Houshang Safaipour
(74) *Attorney, Agent, or Firm* — Fitzpatrick, Cella, Harper & Scinto

(57) ABSTRACT

An ink jet printing apparatus comprises a distributing unit configured to distribute print data for printing dot into data used for printing by first printing elements provided in a print head and data used for printing by second printing elements provided in the same print head, and a determining unit configured to, for the data used for printing by the respective parts of the printing element arrays of each of first and second print heads which have the overlapped print regions, determine a ratio between amount of the data used for printing by a combination of the first and second printing element arrays in the first print head and a combination of the first and second printing element arrays in the second print head.

16 Claims, 20 Drawing Sheets

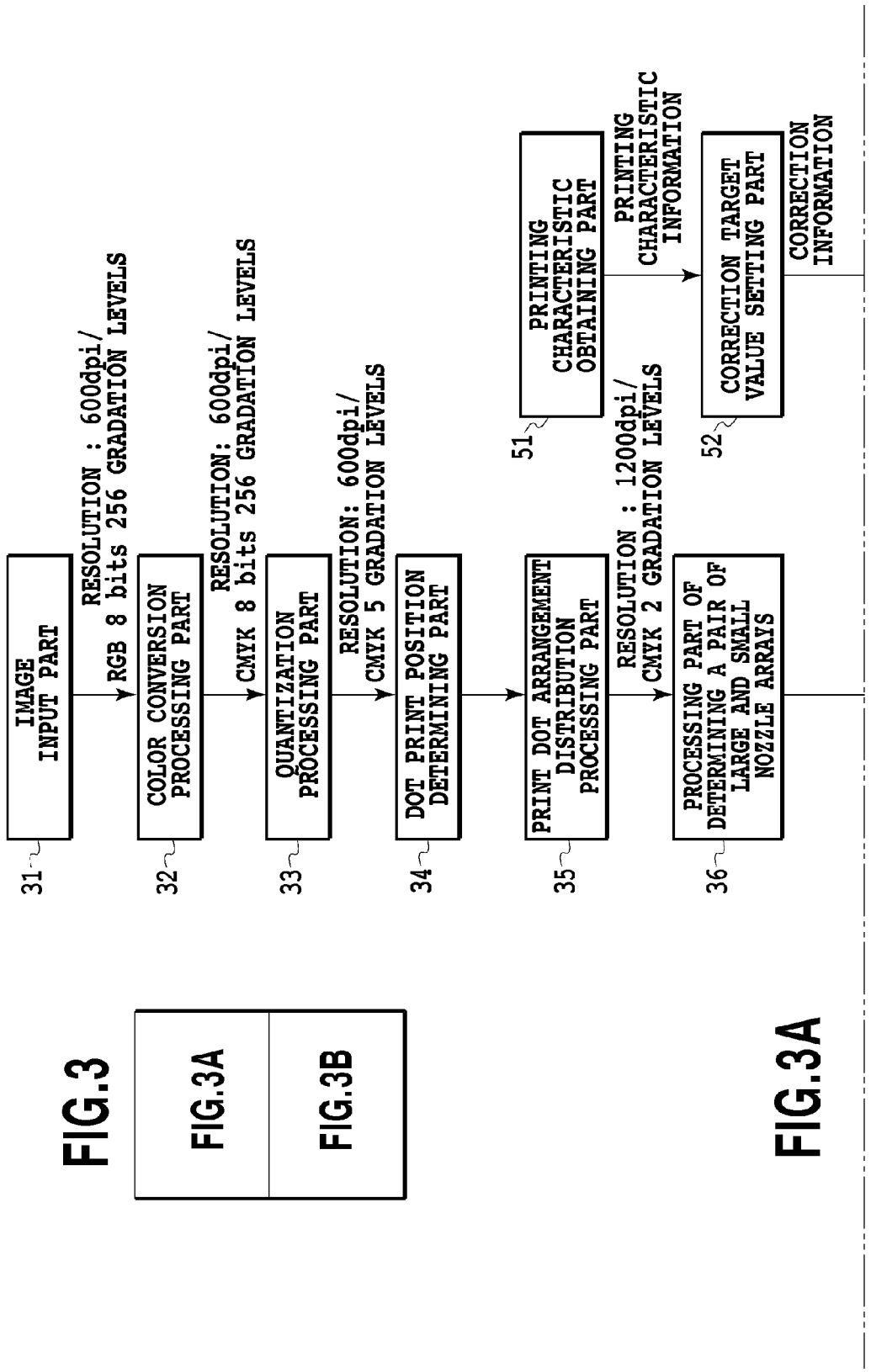

| threshold | Out | Evaluation |
|---|---|---|
| 255 | Level 4 | 255 |
| 224 | Level 3 | 192 |
| 160 | Level 2 | 128 |
| 96 | Level 1 | 64 |
| 32 | Level 0 | 0 |
| 0 | | |

(a) ● PRINT DOT POSITION (b) ☆ SELECTED PRINT DOT (c-1) ◉ LARGE DOT
○ SMALL DOT (d-1) ◉ LARGE DOT
○ SMALL DOT (e)

(f)

(c-2) INTEGRATED POTENTIAL AFTER FIRST DOT IS ARRANGED ▓ PRESENCE OF PRINT DOT

|   | 0 | 1 | 2 | 3 | 4 | 5 | 6 | 7 |
|---|---|---|---|---|---|---|---|---|
| 0 | 72 | 54 | 42 | 36 | 42 | 54 | 72 | 80 |
| 1 | 116 | 76 | 49 | 42 | 49 | 76 | 116 | 141 |
| 2 | 410 | 169 | 76 | 54 | 76 | 169 | 410 | 635 |
| 3 | 2506 | 410 | 116 | 72 | 116 | 410 | 2506 | 10006 |
| 4 | 10006 | 635 | 141 | 80 | 141 | 635 | 10006 | 50004 |
| 5 | 2506 | 410 | 116 | 72 | 116 | 410 | 2506 | 10006 |
| 6 | 410 | 169 | 76 | 54 | 76 | 169 | 410 | 635 |
| 7 | 116 | 76 | 49 | 42 | 49 | 76 | 116 | 141 |

(c-3)

■ 50000-55000
▨ 45000-50000
▨ 40000-45000
▨ 35000-40000
▨ 30000-35000
▨ 25000-30000
▨ 20000-25000
▨ 15000-20000
▨ 10000-15000
▨ 5000-1000
☐ 0-5000

(d-2) ▓ PRESENCE OF PRINT DOT

|   | 0 | 1 | 2 | 3 | 4 | 5 | 6 | 7 |
|---|---|---|---|---|---|---|---|---|
| 0 | 482 | 2560 | 10048 | 2542 | 452 | 170 | 144 | 196 |
| 1 | 285 | 486 | 684 | 452 | 218 | 152 | 170 | 217 |
| 2 | 486 | 285 | 217 | 170 | 152 | 218 | 452 | 684 |
| 3 | 2560 | 482 | 196 | 144 | 170 | 452 | 2542 | 10048 |
| 4 | 10082 | 751 | 282 | 196 | 217 | 684 | 10048 | 50053 |
| 5 | 2675 | 820 | 751 | 482 | 285 | 486 | 2560 | 10082 |
| 6 | 820 | 2675 | 10082 | 2560 | 486 | 285 | 482 | 751 |
| 7 | 751 | 10082 | 50053 | 10048 | 684 | 217 | 196 | 282 |

(d-3) INTEGRATED POTENTIAL AFTER SECOND DOT IS ARRANGED

■ 50000-55000
▨ 45000-50000
▨ 40000-45000
▨ 35000-40000
▨ 30000-35000
▨ 25000-30000
▨ 20000-25000
▨ 15000-20000
▨ 10000-15000
▨ 5000-1000
☐ 0-5000

| FIG.16A |
| FIG.16B |

PRINT DOT ARRANGEMENT

71-LARGE DOT　71-SMALL DOT　72-LARGE DOT　72-SMALL DOT

DISTRIBUTION　　DISTRIBUTION
　MASK A　　　　　MASK B 71a　　　　71b　　　　71c　　　　71d 72a　　　　72b　　　　72c　　　　72d

INKJET PRINTING APPARATUS AND PRINT DATA GENERATING METHOD

BACKGROUND OF THE INVENTION

1. Field of the Invention

The present invention relates to an inkjet printing apparatus and a print data generating method, and in particular, to print data generation upon performing printing by using a print head unit equipped with a plurality of print heads having overlapped printing regions.

2. Description of the Related Art

In a print head unit for use in an inkjet printing apparatus such as a printer, in which a plurality of print heads are arrayed so that nozzles of the print heads are arrayed over a certain range of a length that is longer than a length of one of the plurality of print heads, the print heads are arrayed in such a manner that respective parts of the adjacent print heads have overlapped printing regions each other. Print data for the respective parts of the adjacent print heads for printing the overlapped printing region is generated in a different manner from that of generation of print data for the other region not overlapped. That is, the print data for the overlapped printing region is subjected to a print data generating process of being distributed to each print head in a predetermined ratio (hereinafter, called a connecting process).

In the print head unit with many nozzles, such as the aforementioned print head unit structured for a plurality of print heads to be arrayed, there are many cases where any variation occurs in printing characteristics such as an ejection amount among the nozzles. Accordingly, there have been conventionally made proposals for reducing density unevenness in a print image due to such variations. U.S. Pat. No. 7,249,815 describes an example thereof where actual liquid droplet amounts of a plurality of nozzles are found and a use ratio of nozzles having a relatively large ejection liquid droplet amount and nozzles having a relatively small ejection liquid droplet amount, that is, a distribution ratio of print data, is determined based upon the actual liquid droplet amounts, thereby achieving a target average liquid droplet amount as a whole. Therefore, even if there occur variations in the printing characteristics such as an ejection amount among the nozzles, the printing in which density unevenness is reduced can be performed.

In some cases, however, in the technology described in U.S. Pat. No. 7,249,815, while the variation in the printing density is corrected, a pattern of dots printed is changed. That is, depending upon the use ratio of nozzles having a relatively large ejection liquid droplet amount and nozzles having a relative small ejection liquid droplet amount, a dot which is supposed to be originally printed by some nozzle is printed by the other nozzle based upon the above distribution, so that the printing position possibly differs. In consequence, when correction by more than a predetermined degree is made, while the density is corrected, a difference in the dot pattern is visualized, leading to degradation of image quality.

Incidentally, even if there does not occur the difference in the dot pattern by appropriately performing the distribution of the print data among nozzles correspondingly to the printing characteristics described above, an application of the aforementioned connecting process raises a problem that exclusiveness of the print data in the above distribution process is damaged. As a result, there occurs a defect or overlap of the print dots, thus generating different density unevenness.

SUMMARY OF THE INVENTION

An object of the present invention is to provide an inkjet printing apparatus and a print data generating method in which there occurs no difference in a dot printing position by a print data distribution among nozzles corresponding to printing characteristics, and even if a connecting process is executed, density unevenness due to a defect or the like of print dots can be reduced.

In a first aspect of the present invention, there is provided an ink jet printing apparatus that performs printing by using a print head unit including a plurality of print heads in each of which a first printing element array arranging first printing elements for forming a first size of dots on a print medium and a second printing element array arranging second printing elements for forming a second size of dots on the print medium are provided, the second printing element array being arranged along the first printing element array, respective plurality of the first and the second printing element arrays being arranged in a direction intersecting an array direction of the printing elements in each printing element array, and different print heads being arranged so that respective parts of the plurality of printing element arrays of the different print heads have overlapped print regions on the print medium with each other along the array direction, the apparatus comprising: a distributing unit configured to distribute print data for printing the dot into data used for printing by the first printing elements provided in a print head and data used for printing by the second printing elements provided in the same print head; and a determining unit configured to, for the data used for printing by the respective parts of the printing element arrays of each of the first and second print heads which have the overlapped print regions, determine a ratio between amount of the data used for printing by a combination of the first and second printing element arrays in the first print head and a combination of the first and second printing element arrays in the second print head, the combination of each of the first and second print heads consisting of the first and second printing element arrays in which positions of respective ends of the printing elements of the respective parts of the printing element arrays in the array direction are identical to each other and which are provided in the same print head.

In a second aspect of the present invention, there is provided a print data generation method of generating print data used for performing printing by using a print head unit including a plurality of print heads in each of which a first printing element array arranging first printing elements for forming a first size of dots on a print medium and a second printing element array arranging second printing elements for forming a second size of dots on the print medium are provided, the second printing element array being arranged along the first printing element array, respective plurality of the first and the second printing element arrays being arranged in a direction intersecting an array direction of the printing elements in each printing element array, and different print heads being arranged so that respective parts of the plurality of printing element arrays of the different print heads have overlapped print regions on the print medium with each other along the array direction, the apparatus comprising: a distributing step of distributing print data for printing the dot into data used for printing by the first printing elements provided in a print head and data used for printing by the second printing elements provided in the same print head; and a determining step of, for the data used for printing by the respective parts of the printing element arrays of each of the first and second print heads which have the overlapped print regions, determining a ratio between amount of the data used for printing by a combination of the first and second printing element arrays in the first print head and a combination of the first and second printing element arrays in the second print head, the combination of each of the first and second print heads consisting of the first and second printing element arrays in which positions of respective ends of the printing elements of the respective parts of the printing element arrays in the array direction are identical to each other and which are provided in the same print head.

According to the above configuration, there occurs no difference in a dot printing position by a print data distribution among nozzles corresponding to printing characteristics, and even if a connecting process is executed, density unevenness due to a defect or the like of print dots can be reduced.

Further features of the present invention will become apparent from the following description of exemplary embodiments with reference to the attached drawings.

DESCRIPTION OF THE EMBODIMENTS

Hereinafter, embodiments of the present invention will be in detail explained with reference to the accompanying drawings.

(Outline of Line Printer)

Figure 1:
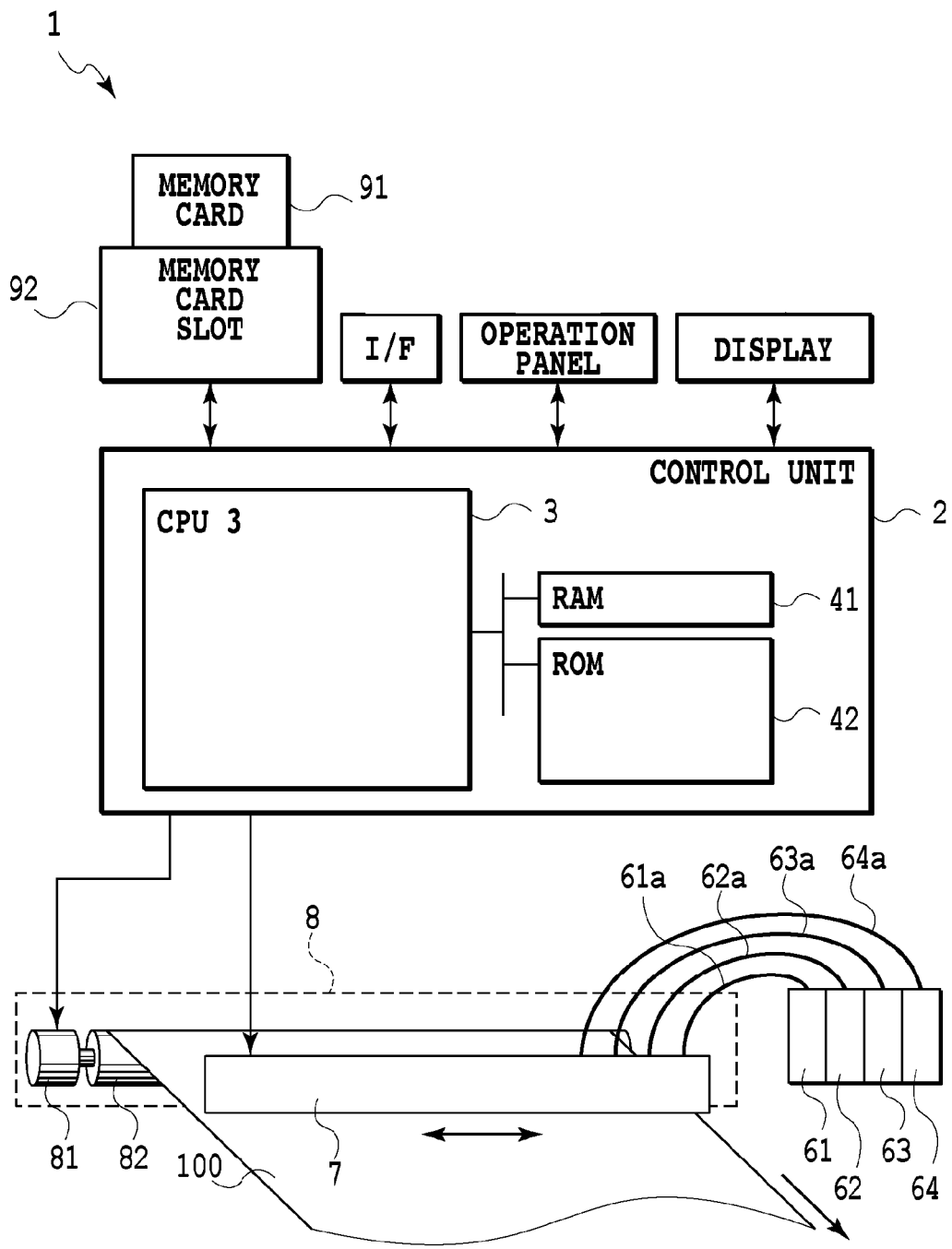
FIG. 1 is an explanatory diagram showing a schematic construction of a printing apparatus to which the present invention can be applied.

FIG. 1 is a block diagram showing a schematic construction of an inkjet printing apparatus 1 according to a first embodiment in the present invention. The printing apparatus 1 is a line printer of an inkjet type, and is, as shown in the same figure, provided with a control unit 2, ink cartridges 61 to 64, a print head unit 7, a printing medium conveyance mechanism 8, and the like. The ink cartridges 61 to 64 correspond to respective inks expressing colors of cyan (C), magenta (M), yellow (Y), and black (K).

The print head unit 7 is a print head unit of a full line type, and is provided with a plurality of nozzle arrays each of which corresponds to each ink color and comprises a plurality of nozzles arrayed on a surface opposing a printing medium in a direction at right angles to a conveyance direction of the printing medium. The print head unit in the present embodiment adopts a method of ejecting ink from each of nozzles by a bubble generated in the ink by heat. Each ink in the ink cartridges 61 to 64 is supplied to each nozzle of the print head unit for each ink color corresponding to each ink through ink introduction conduits 61a to 64a, and the ink is ejected from the nozzles to perform printing on a printing medium 100.

The printing medium conveyance mechanism 8 is provided with a paper feeding motor 81 and a paper feeding roller 82. The paper feeding motor 81 conveys the printing medium 100 to a position of the print head unit 7 in a direction at right angles to the paper feeding roller 82 with rotation of the paper feeding roller 82.

The control unit 2 is structured by including a CPU 3, a RAM 41, a ROM 42 and the like, and controls operations of the print head unit 7 and the paper feeding motor 81 described above. The CPU 3 develops control programs stored in the ROM 42 to the RAM 41 for execution, and thereby executes a process such as print data generation to be described later by referring to FIG. 4 or the like, and performs control of the printing medium conveyance mechanism 8 or the like.

Figure 2A:
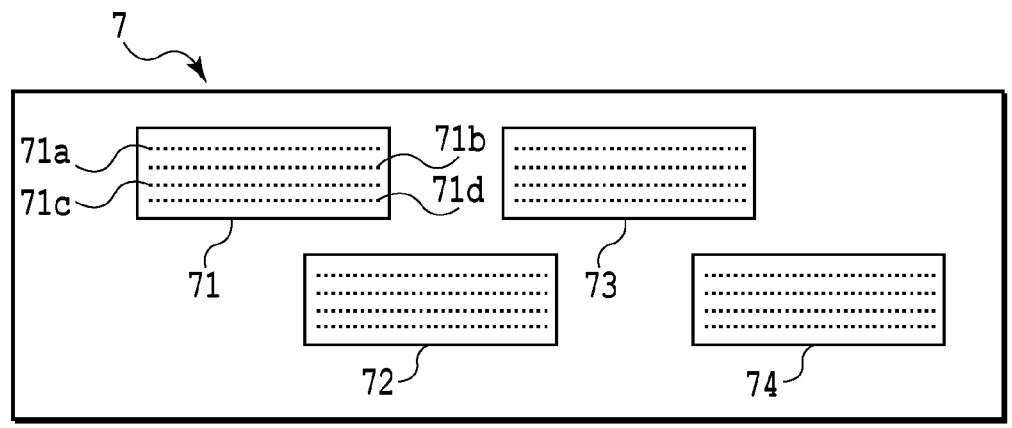
FIGS. 2A and 2B are diagrams each showing a detailed construction of a print head unit.
Figure 2B:
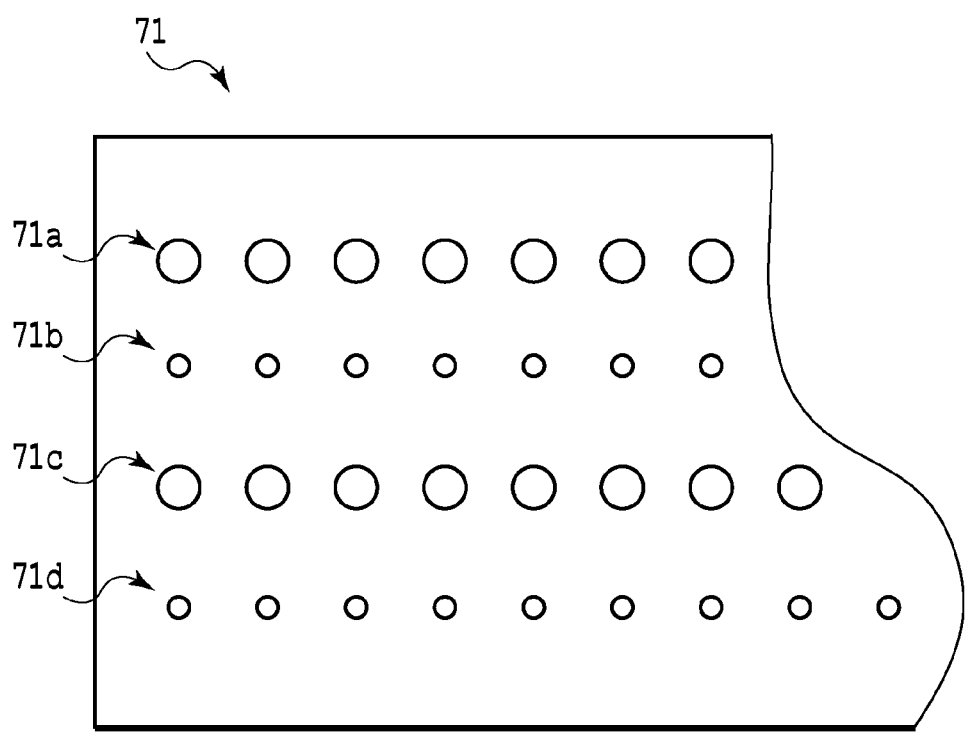

FIGS. 2A and 2B are diagrams showing a detailed construction of the print head unit 7 shown in FIG. 1 in regard to a single ink color. As shown in FIG. 2A, the print head unit 7 in the present embodiment is structured such that print heads (print chips) 71 to 74 each provided with four nozzle arrays are arranged in a zigzag manner. That is, in the print head unit, the print heads are provided to partially overlap with each other.

Inks ejected from nozzles in the print heads in the zigzag arrangement are used to print dots so that one raster along an array direction of the print heads is formed, by adjusting timing between conveyance of the printing medium and the ink ejection. FIG. 2B is a diagram showing the details of the print head 71 which is one of the print heads constituting the print head unit 7. The print head 71 is formed of nozzle arrays 71a, 71b, 71c and 71d which can print two kinds of dot diameters. Among them, each of the nozzle arrays 71a and 71c can print a dot diameter larger than each of the nozzle arrays 71b and 71d. More specifically, each nozzle of the nozzle arrays 71a and 71c ejects an ink droplet of a relatively large volume, and each nozzle of the nozzle arrays 71b and 71d ejects an ink droplet of a relatively small volume. In the present embodiment, the print head unit 7 is structured such that two nozzle arrays are different in printing characteristics from the other two nozzle arrays, respectively, such as 71a and 71c, and 71b and 71d, but the nozzle array having the same characteristic may be formed of one array or three or more arrays, or the nozzle arrays may be in a two-dimensional arrangement such as a zigzag arrangement. That is, the print head is only required to have an arrangement of a plurality of nozzle arrays. In addition, the print head unit 7 of the present embodiment ejects ink by a bubble generated by heat, but is not limited to this method. The print head unit is only required to be structured of a full line head unit in which plural print heads are arrayed in a direction perpendicular to the conveyance direction and further, print dots having plural printing characteristics are formed on the same raster to print image data. For example, the print head unit may be an inkjet print head unit of the other ink ejection method such as a piezo method or, as long as print dots having different printing characteristics are printable, may be a print head unit which can print dots having plural different printing characteristics from a single nozzle. Further, the ink color may be ink other than the aforementioned CMYK.

Figure 3B:
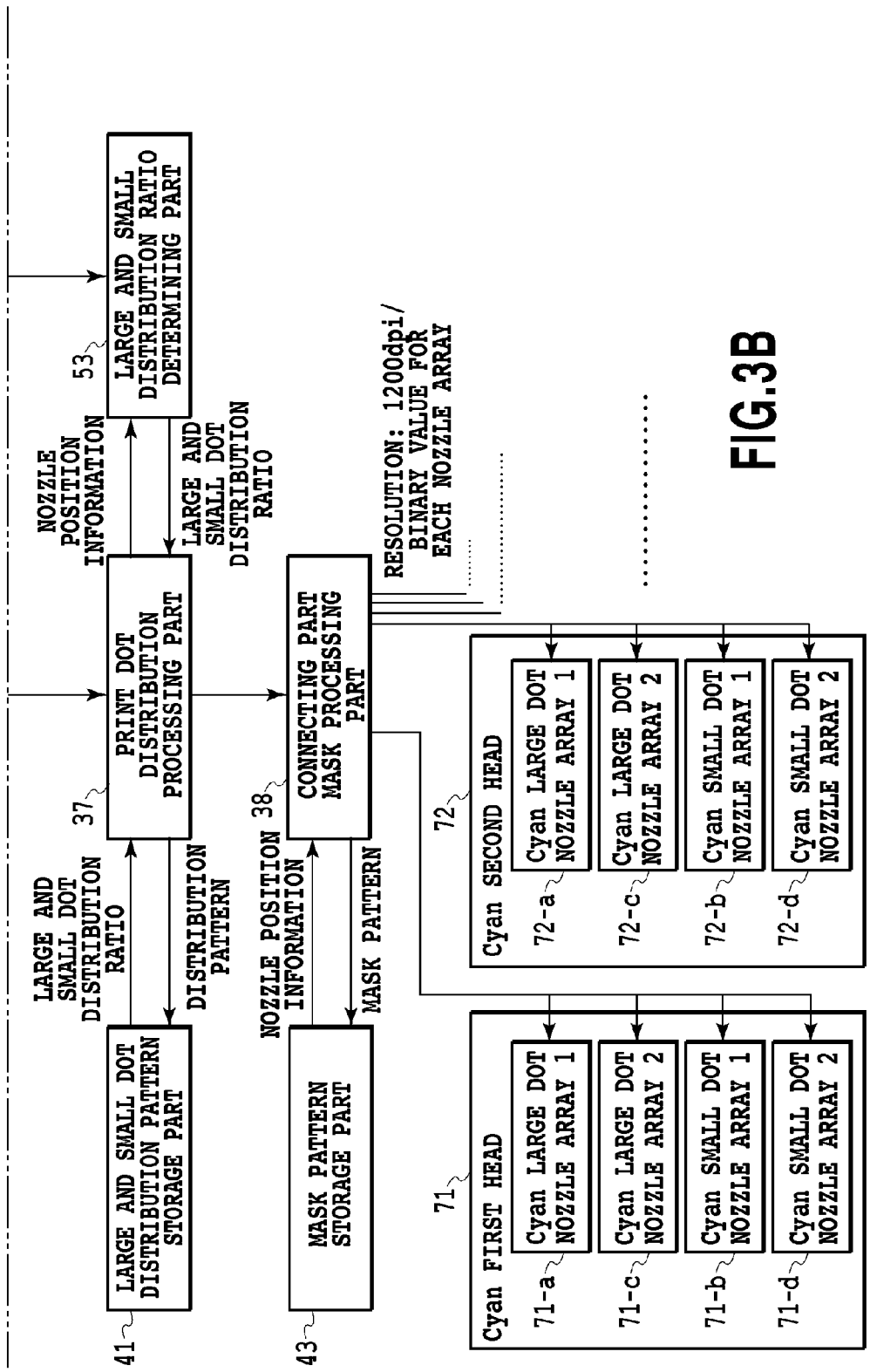
FIG. 3 is a diagram showing a relationship between FIGS. 3A and 3B, and FIGS. 3A and 3B are diagrams showing an image process according to a first embodiment.
Figure 4:
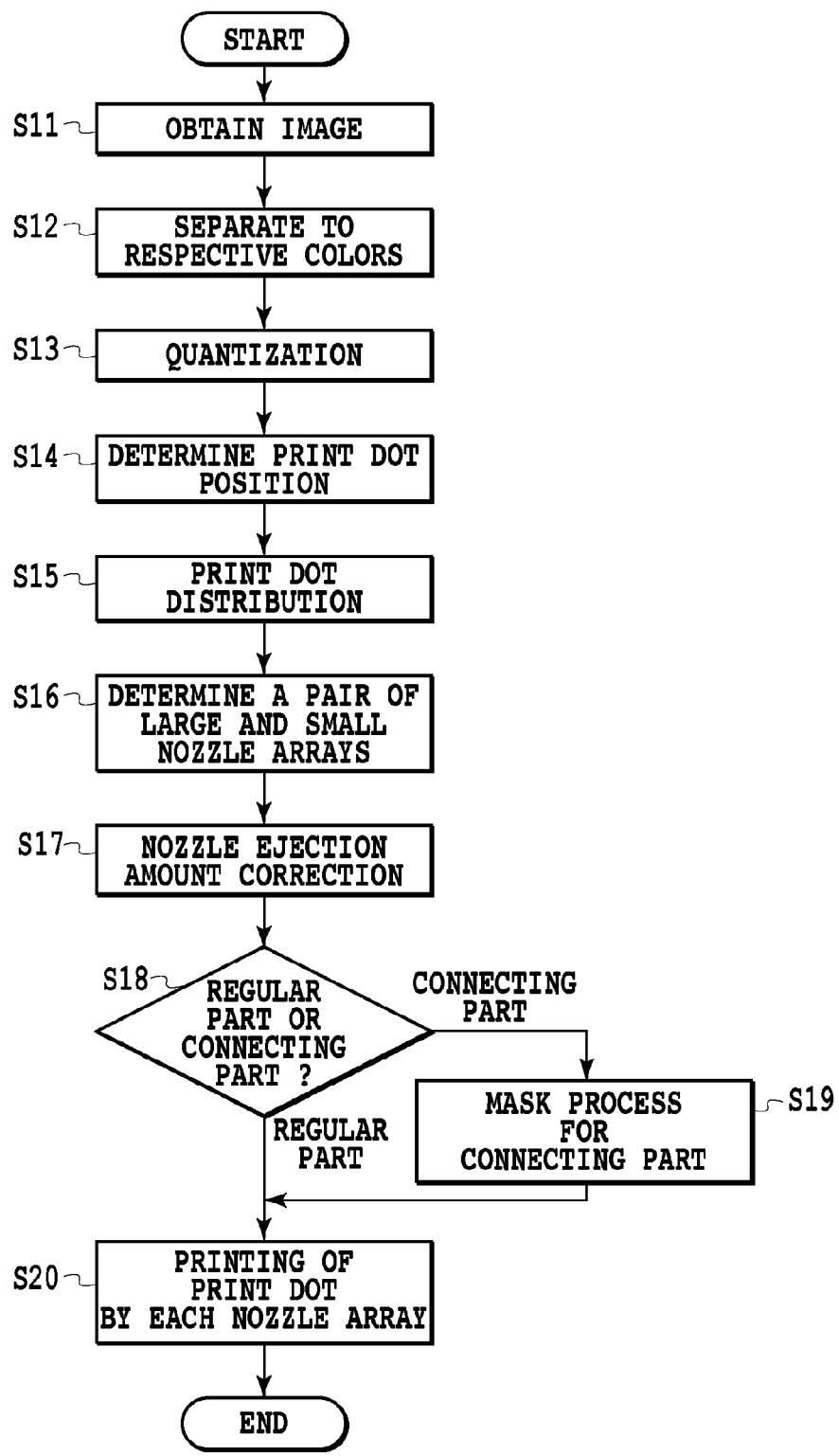
FIG. 4 is a flow chart explaining the image process according to the first embodiment.

FIGS. 3A and 3B are block diagrams showing an image Processing configuration for print data generation by the control unit 2 shown in FIG. 1. FIG. 4 is a flow chart showing the procedure of the image processing. Explaining the outline, an image is obtained at step S11 shown in FIG. 4 by an image input part 31 in FIGS. 3A and 3B. Likewise a color conversion processing part 32 performs color separation at step S12 and a quantization processing part 33 performs quantization at step S13. Further, a dot printing position determining part 34 performs a dot position determination at step S14, and a print dot arrangement distribution processing part 35 performs a print dot distribution at step S15. A determination processing part 36 of a pair of large and small nozzle arrays performs a determination of a pair of large and small nozzle arrays at step 16. A print dot distribution processing part 37 uses a large and small dot distribution pattern storage part 41, a printing characteristic obtaining part 51, a correction target value setting part 52 and a large and small dot distribution ratio determining part 53 to perform nozzle ejection amount correction at step S17. Further, a connecting processing part 38 uses a mask pattern storage part 43 to execute the connecting process at steps S18 and S19. Finally at step S20, printing of dots by each nozzle array is performed based upon the print data generated by the above processes, that is, the printing operation aforementioned in FIG. 1 is performed.

Hereinafter, the details of the process shown in FIG. 4 will be explained.

(Dot Data Generating Process)

At steps S11 to S14 in FIG. 4, a dot data generating process is executed. More specifically, image data stored in a memory card 91 inserted in memory card slot 92 (FIG. 1), for example, is subjected to processes by the image input part 31, the color conversion processing part 32, the quantization processing part 33 and the dot printing position determining part 34, to be converted into print data expressed in a dot arrangement on the printing medium. Hereinafter, the print data expressing formation of print dots in the print dot arrangement data is also called print dot data.

In more detail, when the image process is started, at step S11 the control unit 2 reads in image data to be printed from the memory card 91 by using the image input part 31. Here, the image data is explained as a color image having 256 gradation levels of 8 bits in each of RGB at a resolution of 600 dpi. However, this process can be applied not only to the color image, but also to a monochrome image likewise. Next, at step S12 the color conversion processing part 32 executes the color conversion process to convert the image data into an image having 256 gradation levels of 8 bits in each color of CMYK at a resolution of 600 dpi. The color conversion process is a process of converting a RGB color image expressed by a combination of each gradation value of R, G and B into data expressed by a gradation value of each color used for printing. The printing apparatus 1 of this embodiment prints an image using inks of four colors of C, M, Y and K. Therefore, the color conversion processing part 32 of the present embodiment executes a process of converting the image data expressed by RGB into data expressed by a gradation value of each color of C, M, Y and K.

Next, at step S13 the quantization processing part 33 executes a quantization process of the image data. The quantization process is a process of reducing gradation values in which the image data having a gradation number of 256 gradation levels of 8 bits is converted into image data having a gradation value of a few gradations (here, 5 values are explained as an example) printable by the printing apparatus 1. In general, in many cases an error diffusion method or a dither method is used for the quantization process.

Figures 5A, 5B:
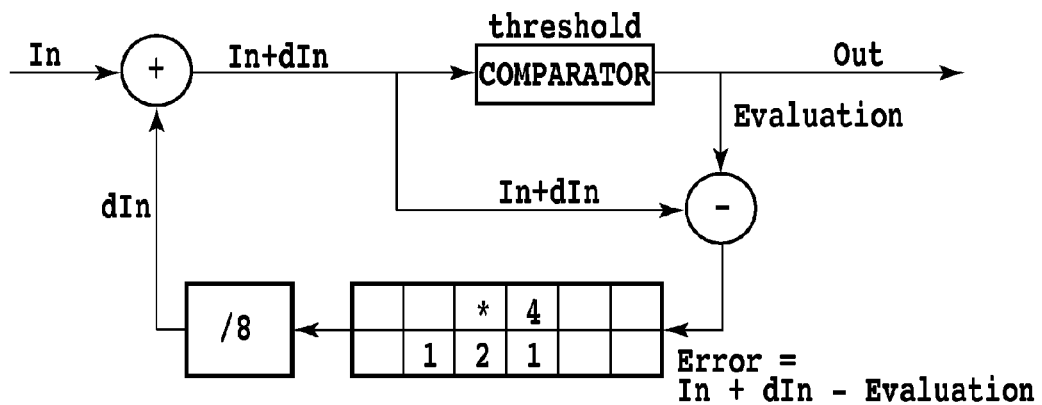
FIGS. 5A and 5B are diagrams each explaining an example of an error diffusion process.

FIG. 5A and FIG. 5B are diagrams explaining the quantization process. FIG. 5A shows a concept of an error diffusion process, and FIG. 5B is a diagram showing a relation between threshold values, output levels and evaluation values in the error diffusion. As shown in the figures, first, a diffusion error value (dIn) from peripheral pixels is added to an image density value (In) to find a corrected density value (In+dIn). Then, the found corrected density value (In+dIn) and a threshold value are compared in a comparator to output an output level defined by the threshold value corresponding to a value of the corrected density value. In this case, when the corrected density value (In+dIn) is "32 or less", "Level 0" is outputted as the output level, and when from "more than 32 to 96 or less", "Level 1" is outputted as the output level. Next, an evaluation value is subtracted from the corrected density value (In+dIn) to calculate a multi-valued error (Error=In+dIn−Evaluation), and for diffusing the error to the peripheral pixels, a weighting calculation is made to the error, which will be added to an error buffer. Here, the relation between the output level and the evaluation value is defined according to FIG. 5B in such a manner that, when the output level is "Level 4", the evaluation value is "255", when the output level is "Level 3", the evaluation value is "192", when the output level is "Level 2", the evaluation value is "128", when the output level is "Level 1", the evaluation value is "64", and when the output level is "Level 0", the evaluation value is "0". Finally, the error value diffused in an object pixel position is taken out from the error buffer, and then is normalized by a sum of the weighting coefficients to find a diffusion error (dIn) to the next pixel. The above process is repeatedly executed on all the pixels. As described above, the data having 256 gradation levels of 8 bits is quantized to data having 5 gradation levels.

Figure 6:
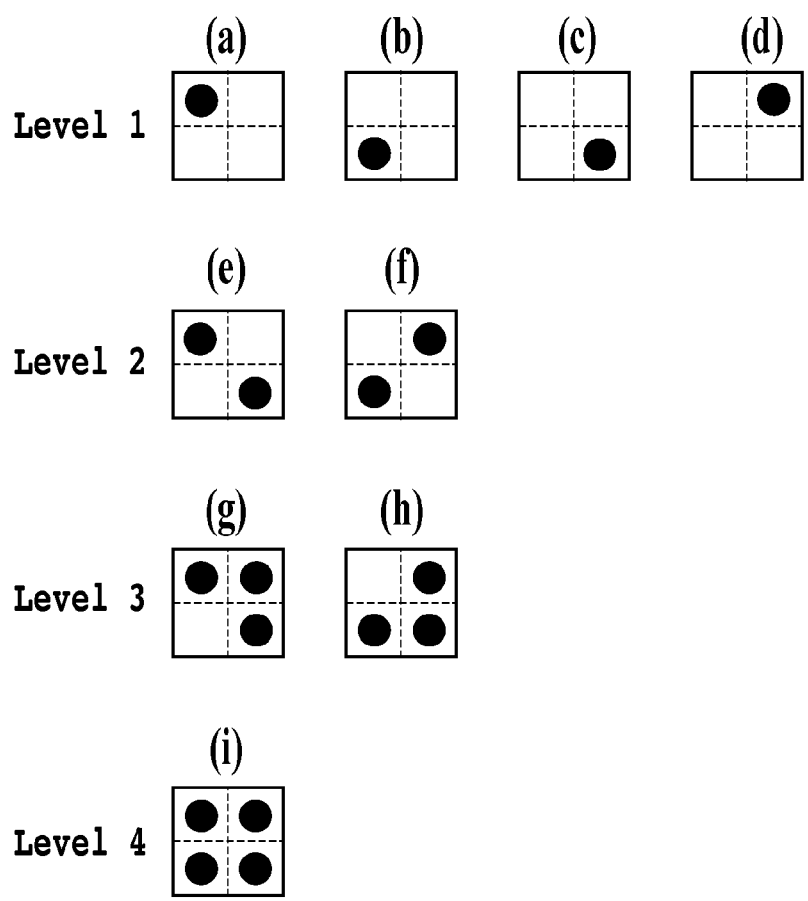
FIG. 6 comprises explanatory diagrams explaining distribution patterns of large and small dots of respective quantization levels according to the first embodiment.

Next, at step S14 the dot printing position determining part 34 determines a print dot arrangement in the print pixel from the quantized image data quantized to a low gradation for each print pixel. FIG. 6 comprises diagrams each showing a dot printing position for expressing the quantized image data of 5 values composed of Level 0 to Level 4 at a resolution of 600dpi in the print pixel with a dot pattern at a print dot resolution of 1200 dpi. For example, in a case where the result of the quantization is Level 1, one dot only is printed in the print pixel at a resolution of 600 dpi, wherein the dot printing position is expressed by repetition of a pattern in the top left position ((a) in FIG. 6), a pattern in the bottom left position ((b) in FIG. 6), a pattern in the bottom right position ((c) in FIG. 6), and a pattern in the top right position ((d) in FIG. 6). A similar operation is performed for other levels and a collection of data in which the image data is converted into pattern data of dots is set as print dot arrangement data. In addition, at step S15 a dot distribution of arranging the print dot arrangement data in a region corresponding to the printing medium is performed for printing.

As shown in FIG. 4, next, at steps S16 and S17 the nozzle ejection amount correction process is executed, and at subsequent steps S18 and S19 the connecting process is executed. First, the problems to be solved by the present invention will be explained in relation to these processes. More specifically, an explanation will be made of the problem that applying the connecting process causes damage in the exclusiveness of print data in distribution of the print data to each nozzle array corresponding to printing characteristics in the nozzle ejection amount correction process.

Figure 7:
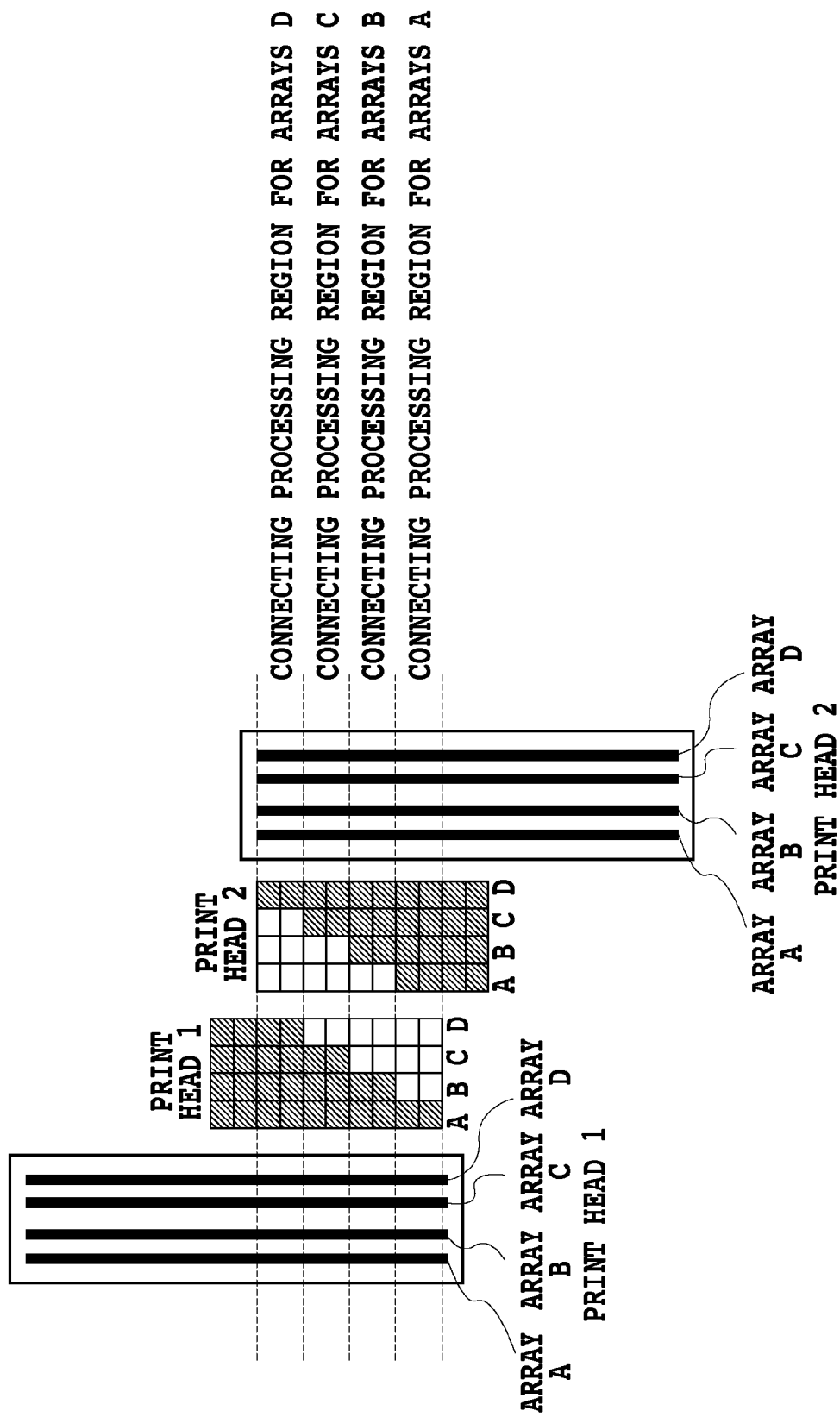
FIG. 7 is a diagram explaining a connecting process.

In the print head unit of the line type shown in FIG. 2A, in which a plurality of print heads are arrayed, for an overlapping part between the adjacent print heads, a process of determining how print data is shared by the respective print heads is executed (in the present specification, called a connecting process). An example of the connecting process includes a method of shifting a region of executing the connecting process for each nozzle array in the print head. FIG. 7 is a diagram explaining a method of shifting the region of executing connecting process for the arrays of plural nozzle arrays A, B, C and D in the adjacent print heads 1 and 2, from each other. The central cell blocks correspond to positions of nozzles on the print medium in a case of dividing the nozzle array into a plurality of nozzle blocks, and the filled cell indicates a cell of nozzles to be used for printing. As shown in FIG. 7, in the regions where arrays indicated by the same Roman letter between the print heads 1 and 2 are used, the connecting process for the nozzle arrays is executed, and the connecting process for the respective arrays A to D is executed while shifting two blocks, respectively. For example, in the connecting process region of arrays A, distribution of print data to be described later in FIG. 8C and FIG. 8D is performed between the nozzle arrays A in the print heads 1 and 2. In addition, with regard to nozzle arrays B, C and D, print data distributed to each nozzle array is set as print data for the nozzle array as it is.

When the connecting process is executed after the nozzle ejection amount correction, the exclusiveness of print data between the print heads, which are distributed to the plural nozzle arrays for each print head by the nozzle ejection amount correction process, is damaged, and as a result, density unevenness due to the defect or the overlap of the print data is possibly caused. More specifically, in the nozzle ejection amount correction process, the distribution of the print data is made in a predetermined distribution ratio to each of a plurality of respective nozzle arrays for each print head, and the distributed print data for each print head has the exclusiveness between the plural nozzles. If the distributed print data is used individually as it is, the exclusiveness is not damaged originally. However, since print data supplied for the connecting process after the nozzle ejection amount correction among the print data of each print head are associated with each other between the print heads, there may be a case where the exclusiveness is damaged between the print heads.

Figure 8A:
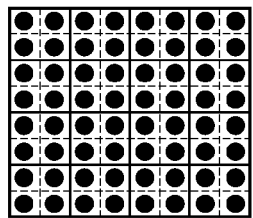
FIGS. 8A to 8D are diagrams explaining problems to be solved by the present invention.
Figure 8B:
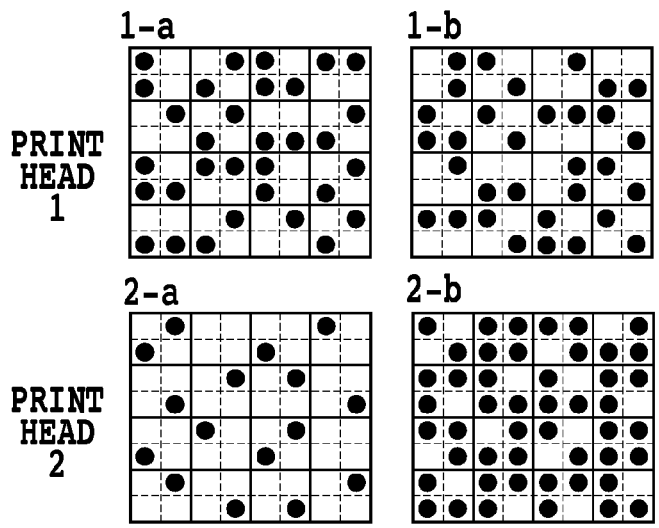
Figure 8C:
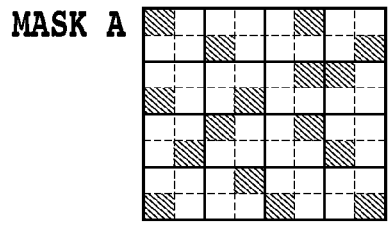
Figure 8C:
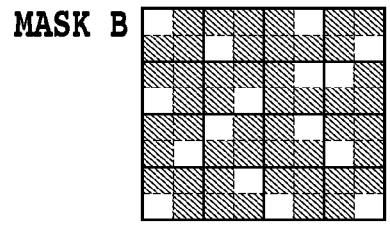
Figure 8D:
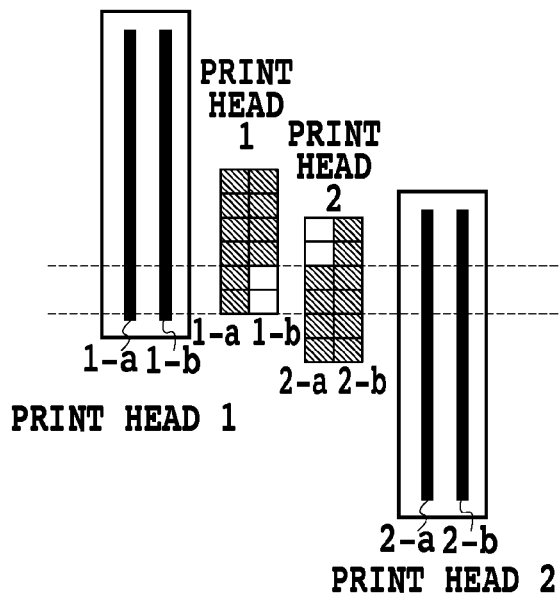

FIGS. 8A to 8D are diagrams explaining occurrence of density unevenness due to the defect or overlap of the print data. For easy explanation, a case where each of the print heads 1 and 2 has two nozzle arrays will be explained as an example. One cell block shown in FIG. 8A corresponds to a pixel on the printing medium and black circles indicate a print data (hereinafter, called also a print dot) arrangement. As shown in FIG. 8A, the connecting region has a print dot arrangement in which a dot is printed in each of all the pixels as an example. FIG. 8B shows a print dot arrangement of each nozzle array in the print heads 1 and 2 to which the nozzle ejection amount correction is already made. FIG. 8B shows an example where in the print head 1, a distribution ratio of print dots to each nozzle array is 1:1 and in the print head 2, a distribution ratio of print dots to each nozzle array is 1:3. As shown in FIG. 8B, since the distribution ratio in the print dots is different between the print heads 1 and 2, the print dot arrangement of nozzle array 1-$a$ of the print head 1 is not identical with the print dot arrangement of nozzle array 2-$a$ of the print head 2, which arrays are to be subjected to the connecting process. FIG. 8C shows masks for making distribution of print dots in the connecting process. FIG. 8D shows nozzle arrays used in a region where the connecting process is executed by nozzle array 1-$a$ and nozzle array 2-$a$. Filled cells indicate nozzle arrays to be used, and in the connecting process, nozzle arrays 1-$a$, 2-$a$, and 2-$b$ are used.

Figure 9A:
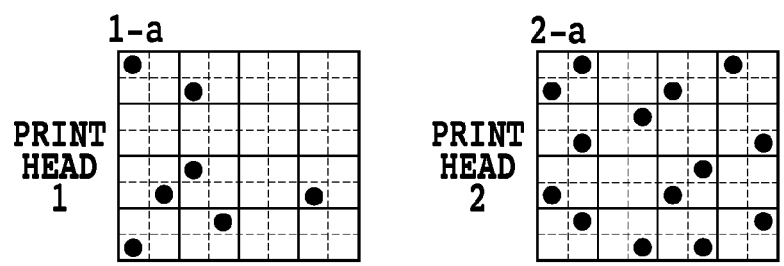
FIGS. 9A and 9B are likewise diagrams explaining problems to be solved by the present invention.
Figure 9B:
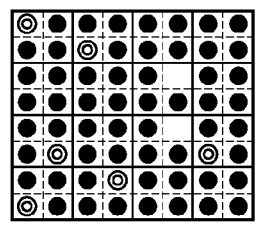

FIG. 9A shows an arrangement of print dots for nozzle array 1-$a$ distributed by using mask A shown in FIG. 8C and an arrangement of print dots for nozzle array 2-$a$ distributed by mask B shown in FIG. 8C. As a result, the print dot arrangements of all the nozzle arrays used in the connecting region shown in FIG. 8D (2-$b$ in FIG. 8B, and 1-$a$ and 2-$a$ in FIG. 9A) are combined to form a print dot arrangement expressed in FIG. 9B. More specifically, in FIG. 9B, a double circle indicates printing two dots, and a blank indicates absence of a print dot, thus finding that the defect or overlap of the print dot occurs. In this case, in FIG. 8B, the print data for nozzle array 1-$a$ and the print data for nozzle array 1-$b$ in the same print head have the exclusiveness to each other by the distribution by the nozzle ejection amount correction process. Likewise, the print data for nozzle array 2-$a$ and the print data for nozzle array 2-$b$ in the print head 2 have the exclusiveness to each other by the distribution by the nozzle ejection amount correction process. To this state, in the region of executing the connecting process, as described above, the print data for nozzle array 1-$a$, nozzle array 2-$a$ and nozzle array 2-$b$ are used. In this case, the print data for nozzle array 1-$a$, and the print data for nozzle array 2-$a$ have the exclusiveness to each other by the masks A and B for the connecting process. Therefore there may be a case where no exclusiveness exists between the print data for nozzle array 1-$a$ and the print data for nozzle array 2-$a$.

The present invention prevents occurrence of the defect or the overlap of the print dot due to lack of the exclusiveness of the print data which is possibly generated by executing the connecting process after the nozzle ejection amount correction process as described above. First, an explanation will be made of an outline to each of the nozzle ejection amount correction and the connecting process according to the present embodiment, below.

<Nozzle Ejection Amount Correction>

The nozzle ejection amount correction is performed at step S17 after a process of determining a pair of large and small nozzle arrays is executed at step S16 in FIG. 4. The process of determining the large and small nozzle arrays at step S16 will be described later as several embodiments of the present invention.

The printing characteristic in the nozzle ejection amount correction according to the present embodiment is defined as an ejection amount of nozzles in each print head (71, 72, 73 or 74) of the print head unit 7.

Figure 10:
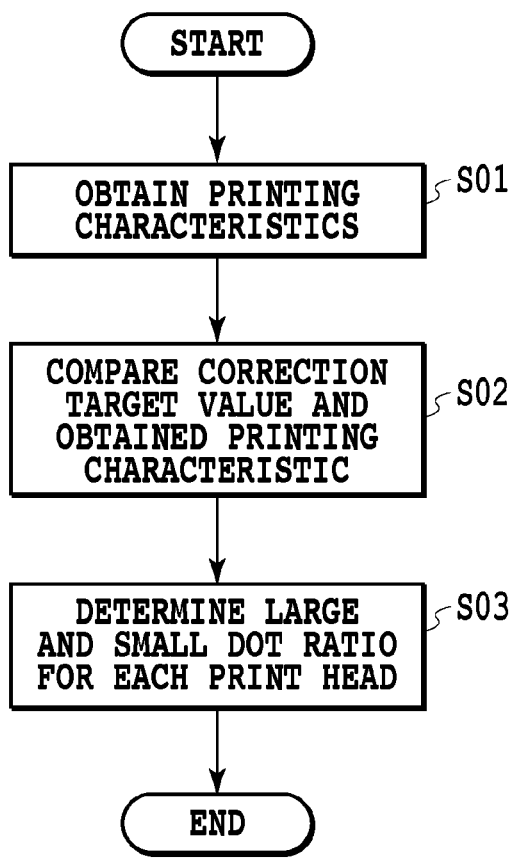
FIG. 10 is a flow chart showing a process of determining a distribution ratio for distributing print data to large and small nozzles in a correction process of a nozzle ejection amount according to the first embodiment.

FIG. 10 is a flow chart showing a process of determining a distribution ratio for distributing the print data to large and small nozzles in the nozzle ejection amount correction process. At step S01 ejection amount information of each of large nozzle arrays (71*a* and 71*c* of the print head 71) and small nozzle arrays (71*b* and 71*d* of the same) in each of the print heads 71 to 74 is obtained by a printing characteristic obtaining part 51. Next, at step S02 a target ejection amount to be ejected by nozzles in each of the print heads 71 to 74 is set by a correction target value setting part 52. Next, at step S03 a large and small dot distribution ratio determining part 53 determines a distribution ratio of print data to the large nozzles and small nozzles based upon the read ejection amount and the set correction target ejection amount for each print head. In the present embodiment, since a nozzle average ejection amount in the nozzle arrays 71*a* and 71*c* is 3 ng, a nozzle average ejection amount in the nozzle arrays 71*b* and 71*d* is 2 ng, and a target ejection amount is 2.5 ng, a distribution ratio of the print head 71 is defined as large nozzle array (3 ng): small nozzle array (2 ng)=1:1.

Next, an explanation will be made of a process of distributing print data to large and small nozzle arrays at the distribution ratio determined as described above. The print dot distribution processing part 37 shown in FIGS. 3A and 3B transmits information on a nozzle position for printing a print dot (information on which print head prints the print dot in the present embodiment) to the large and small dot distribution ratio determining part 53, and thereafter, receives distribution ratio information determined based upon the printing characteristic information of the print head. Subsequently the print dot distribution processing part 37 transmits the distribution ratio information to the large and small dot distribution pattern storage part 41, and thereafter, receives a large and small dot distribution pattern. In addition, the large and small dot distribution pattern is used to distribute each print dot data in the print dot arrangement data determined at step S14 in FIG. 4 to the nozzle arrays having a different printing characteristic, thus generating each print data different in the characteristic. In the present embodiment, two kinds of print dots of 3 ng and 2 ng are used to obtain binary large dot arrangement data and binary small dot arrangement data at a resolution of 1200 dpi to the respective large and small print data distributed such that a ratio of the print dot numbers of the print dots of each other is 1:1.

Figure 11:
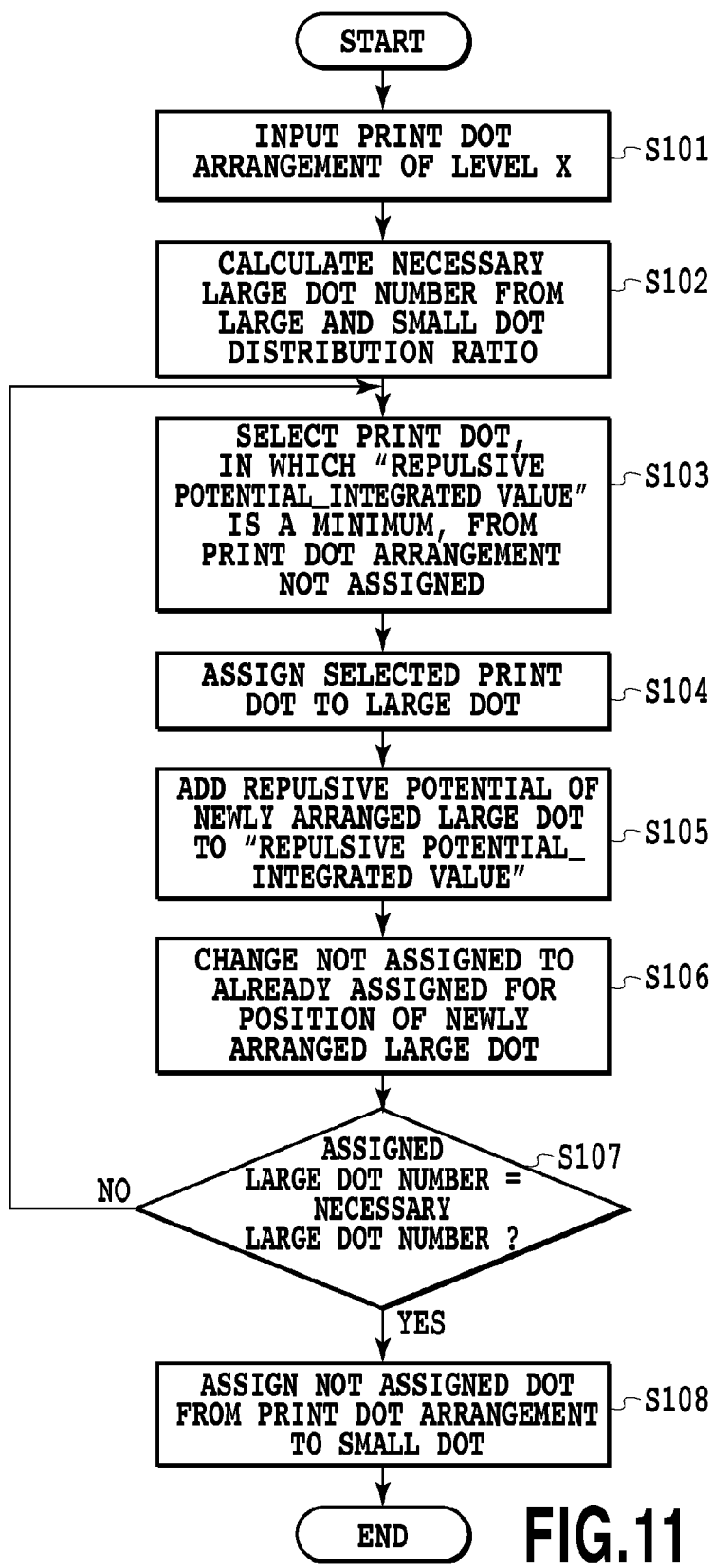
FIG. 11 is a flow chart showing a distribution pattern generating process of large and small dots using repulsive potential according to the first embodiment.
Figure 12:
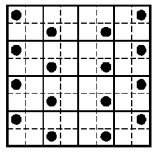
FIG. 12 is a diagram explaining the distribution pattern generating process using the repulsive potential according to the first embodiment.
Figure 12:
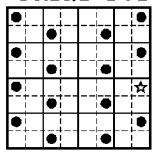
Figure 12:
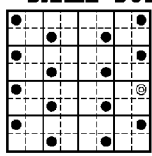
Figure 12:
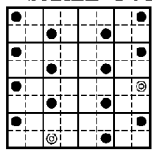
Figure 12:
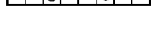
Figure 12:
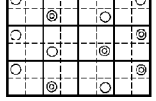
Figure 12:
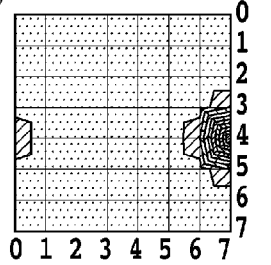
Figure 12:
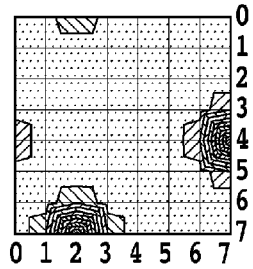

An explanation will be made of a process as an example of the above large and small dot distribution pattern generation. FIG. 11 is a flow chart showing the large and small dot distribution pattern generating process by using repulsive potential. In FIG. 11, at step S101 a print dot arrangement of quantization Level desired to generate the large and small dot distribution pattern is inputted. In the present description, a print dot arrangement shown as a partial diagram (a) in FIG. 12 as quantization Level is explained as an example. The print dot arrangement of the partial diagram (a) in FIG. 12 expresses print dot arrangement data as a dot image on the printing medium. Black circles indicate formation of dots and correspond to an image of the print dot data. The cell block indicates a pixel on the printing medium. Next, at step S102 a necessary large dot number is calculated based on the large and small dot distribution ratio and the print dot number of the inputted quantization Level. In the present embodiment, since the print dot number of the partial diagram (a) in FIG. 12 is 16 and the large and small dot distribution ratio is 1:1, the necessary large dot number is 16×0.5=8 dots. Next, at step S103 a print dot in which "a repulsive potential_integrated value" is a minimum is selected in the print dot arrangement. In regard to the distribution of a first dot, since "the repulsive potential_integrated value" is "0" in any position, an arbitrary print dot is selected. In the present invention, it is assumed that {X, Y}={7, 4} (position of a star mark of a partial diagram (b) in FIG. 12) is selected. Next, at step S104 the selected print dot is assigned to a large dot (double circle mark of a partial diagram (c-1) in FIG. 12). Next, at step S105 the repulsive potential of the assigned large dot is added to "the repulsive potential_integrated value".

Figure 13:
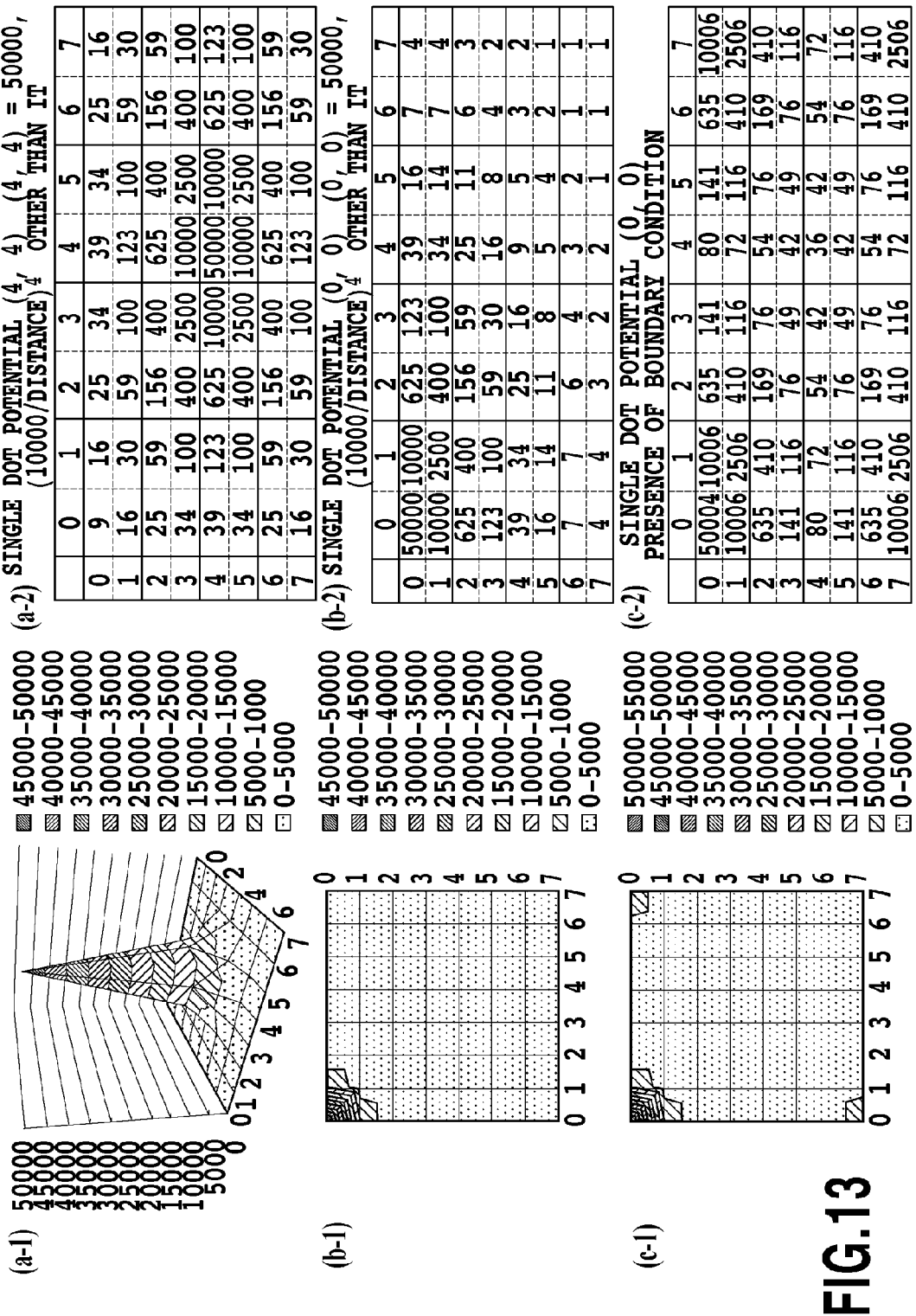
FIG. 13 is an explanatory diagram explaining the repulsive potential.

FIG. 13 is a diagram explaining the repulsive potential. In the present embodiment, for obtaining more inclined repulsive potential in the center of the dot arrangement, isotropic repulsive potential, in which the potential in the center of the dot arrangement is "50000" and the potential of regions other than it is "(10000 by distance)$^4$", is used. A partial diagram (a-1) in FIG. 13 is expressed by graphing the potential, and a partial diagram (a-2) in FIG. 13 is a table expressing repulsive potential of respective coordinates of lateral X coordinates (0 to 7) and longitudinal coordinates (0 to 7). As apparent from the partial diagrams (a-1) and (a-2) in FIG. 13, potential having a steep inclination around {4, 4} is obtained. The diagram in which the center of the potential shown in the partial diagrams (a-1) and (a-2) in FIG. 13 is moved to {0, 0} corresponds to the partial diagrams (b-1) and (b-2) in FIG. 13. When the repulsive potential of the single dot is indicated at Pot_alone, the potential of position {x, y}:

Pot_alone=50000 {x=0, y=0}

10000 by $(x^2+y^2)^2$ {x≠0, y≠0}.

For meeting the boundary condition, assuming that the same pattern continues in the upper, lower, right and left directions including an inclined direction, repulsive potential Pot {x, y} in position{x, y}:

$$\begin{aligned}\text{Pot\_0}(x, y) = {} & \text{Pot\_alone}(x + \text{array\_X}, y + \text{array\_Y}) + \\ & \text{Pot\_alone}(x, y + \text{array\_Y}) + \text{Pot\_alone}(x - \text{array\_X}, y + \text{array\_Y}) + \\ & \text{Pot\_alone}(x + \text{array\_X}, y) + \text{Pot\_alone}(x, y) + \\ & \text{Pot\_alone}(x - \text{array\_X}, y) + \text{Pot\_alone}(x + \text{array\_X}, y - \text{array\_Y}) + \\ & \text{Pot\_alone}(x, y - \text{array\_Y}) + \text{Pot\_alone}(x - \text{array\_X}, y - \text{array\_Y})\end{aligned}$$

array_X: X size of print dot pattern(eight in the present embodiment)

array_Y: Y size of print dot pattern(eight in the present embodiment).

A state of the repulsive potential at this time is shown in partial diagrams (c-1) and (c-2) in FIG. 13.

Since repulsive potential of {x, y} in a case where a large dot is arranged in any position {a, b} is found only by assigning a relative position from {a, b} to Pot_0 (x, y) described above, the repulsive potential:

Pot_ab (x, y)=Pot_0 (Pos_x, Pos_y)

Pos_x=x−a {case of x≥a}, a−x {case of x≤a}

Pos_y=y−b {case of y≥b}, b−y {case of y≤b}

An integrated value of "repulsive potential_integrated value" found by adding the repulsive potential to coordinates {7, 4} at step S105 is shown in a partial diagram (c-2) in FIG. 12. A partial diagram (c-3) in FIG. 12 is a contour graph of "repulsive potential_integrated values" at this time. As shown in the figure, it is found that values of the repulsive potential are integrated around the position of {X, Y}={7, 4} where a large dot is arranged.

Next, at step S106 in FIG. 11 a state of the print dot in a position where the large dot is arranged changes from "not distributed" to "distributed". Next, at step S107 the arranged large dot number is compared with the necessary large dot number found before at step S102. In a case where not reached yet, the process goes back to step S103, wherein the process is repeated.

A large dot arrangement of the second dot will be explained continuously. "Shaded areas" in the partial diagram (c-2) in FIG. 12 show locations where print dots are arranged. At step S103 a location of the smallest repulsive potential_integrated value is found from "the shaded areas" and a print dot of the corresponding location is selected. Since {2, 1} and {2, 7} have the same value in the partial diagram (c-2) in FIG. 12, which location should be selected is determined by random numbers, and in the present embodiment, it is estimated that {2, 7} is selected. When the print dot is selected, as similar to the first dot, at steps S104 and S105 the selected dot is distributed to the large dot, and further, repulsive potential of the new large dot is added to "the repulsive potential_integrated value". A partial diagram (d-1) in FIG. 12 shows a state where a large dot is distributed to {2, 7}, and a partial diagram (d-2) in FIG. 12 shows "repulsive potential_integrated value" at the time of adding the repulsive potential of the newly distributed large dot to {2, 7}. A partial diagram (d-3) in FIG. 12 is a contour graph of "repulsive potential_integrated values". The above process is repeatedly executed until the arranged large dot number reaches the necessary large dot number. A partial diagram (e) in FIG. 12 is an explanatory diagram showing a state where eight large dots corresponding to half of the whole are arranged when a large and small dot distribution ratio is 1:1. Next, when the arranged large dot number reaches the necessary large dot number, the remaining, undistributed print dots are distributed to small dots at step S108 in FIG. 11, and a large and small dot distribution pattern along the print dot arrangement and the large and small dot distribution ratio can be obtained. A partial diagram (f) in FIG. 12 is an example of generating a large and small dot distribution pattern by using the repulsive potential in the present embodiment. By thus arranging large dots using the repulsive potential, the large dots are arranged more dispersedly in the print dot arrangement. When the large dots are arranged dispersedly, variations due to positions of the density correction by the large and small dot distribution ratio can be suppressed and a difference in a roughness degree between large dots easy to be visualized is eliminated. Therefore, the excellent result of granularity or uniformity also can be obtained.

<Connecting Process>

Figure 14A:
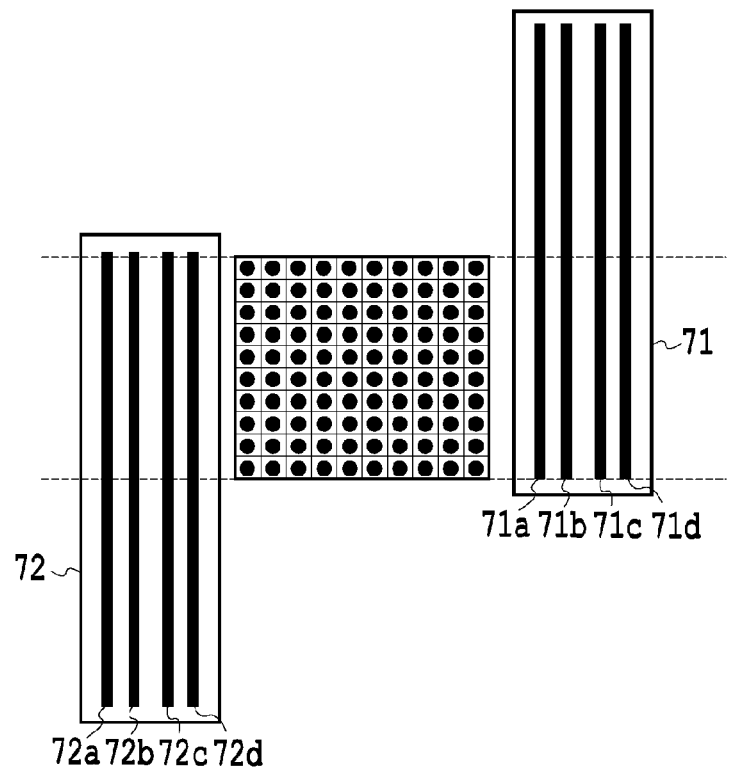
FIGS. 14A to 14C are diagrams explaining an outline of a connecting process to which the present invention can be applied.
Figure 14B:
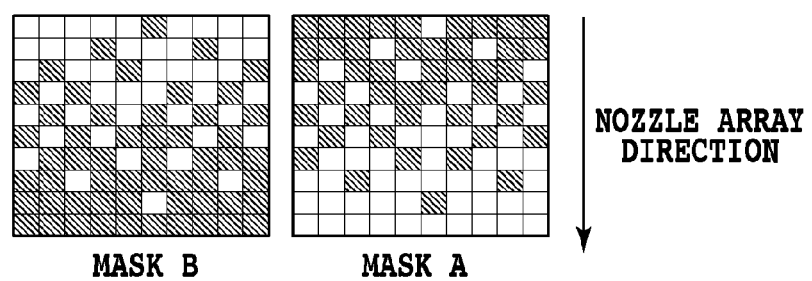
Figure 14C:
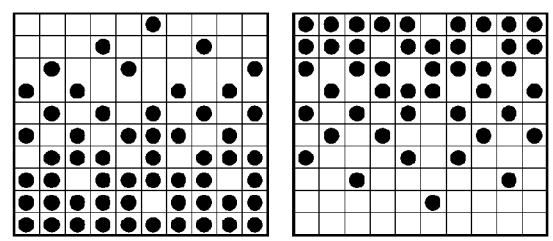

FIGS. 14A to 14C are diagrams explaining an outline of a connecting process according to embodiments of the present invention. The connecting process is executed mainly by the connecting part mask processing part 37 shown in FIGS. 3A and 3B. As shown in the central part of FIG. 14A, print data for a connecting region is expressed as an arrangement of print dots on the printing medium. A black circle indicates formation of a dot and a cell block indicates a pixel on the printing medium. FIG. 14A shows an example where print data in connecting regions of the print heads 71 and 72 is data that dots are formed in all the pixels. In the present embodiment, masks are used for distributing print dot data to each print head for the connecting region at the time of the connecting processing. FIG. 14B shows an example of the masks, which expresses distribution patterns in which density by the print dots changes in the nozzle array direction. The connecting process is a process for finding a logical product of a mask and print dot arrangement data, and calculates a logical product of a square shown in gray (hatched square) in FIG. 14B and a print dot data (black circle) in the print dot arrangement data for each of the corresponding pixels. In more detail, as shown in FIG. 14B, mask A and mask B having the exclusiveness relation with each other are used. The mask A is applied to print data of the print head 71 and the mask B is applied to print data of the print head 72 to perform the above logical product calculation, thereby obtaining print data for the connecting region of each print head as shown in FIG. 14C. In FIG. 14C, the left diagram shows print data distributed to the print head 72 and the right diagram shows print data distributed to the print head 71.

Next, an explanation will be made of an embodiment of a determining process of a pair of large and small nozzle arrays to be executed in relation to the nozzle ejection amount correction process and the connecting process schematically explained.

(First Embodiment)

<Determining Process of Pair of Large and Small Nozzle Arrays>

The present process relates to processes of steps S15 and S16 shown in FIG. 4 and is executed by a determination processing part 36 of a pair of large and small nozzle arrays. FIGS. 15A to 15D are diagrams explaining the details of a process for determining a pair of large and small nozzle arrays according to the first embodiment of the present invention.

Figure 15A:
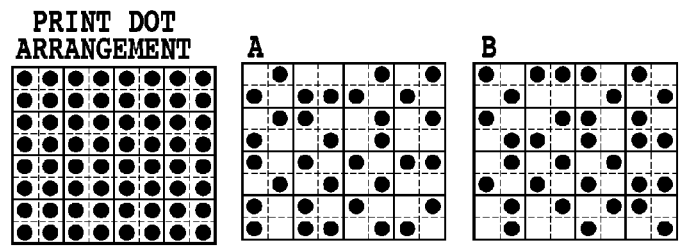
FIGS. 15A to 15D are diagrams explaining a determination on pairs of large and small nozzle arrays in the first embodiment.

The print dot arrangement distribution processing part 35 (FIGS. 3A and 3B) divides the print data generated by the dot data generating process at steps S11 to S14 (FIG. 4) into plural print data having the complementary (exclusiveness) relation with each other as shown in FIG. 15A (step S15). This figure shows an example where print data for printing dots on all the pixels is divided into two print data A and B. Next, at step S16 the determination processing part 36 of the pair of the large and small nozzle arrays determines a pair of large and small nozzle arrays for printing print data A and a pair of large and small nozzle arrays for printing print data B in each of the print heads 71 and 72. In the present embodiment, a pair of nozzle arrays 71a and 71b and a pair of nozzle arrays 72a and 72b are defined as the pair of the large and small nozzle arrays for printing the print data A, and a pair of nozzle arrays 71c and 71d and a pair of nozzle arrays 72c and 72d are defined as the pair of the large and small nozzle arrays for printing the print data B.

Figure 15B:
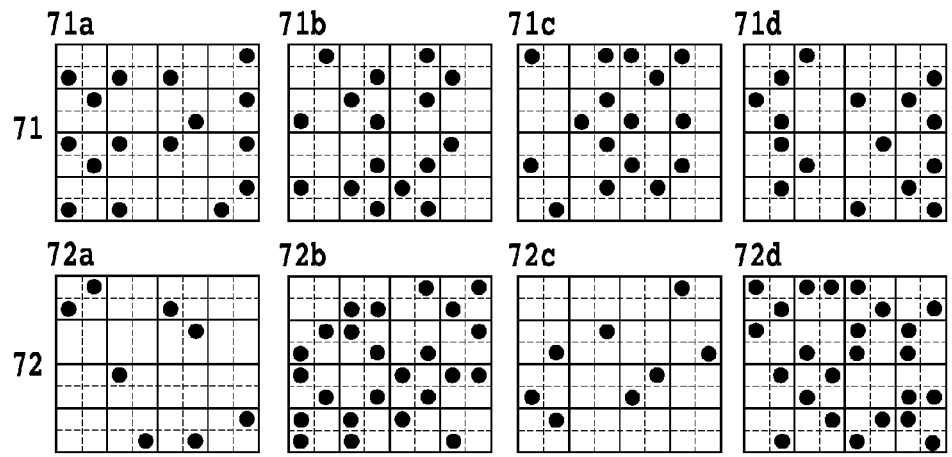

Next, the print dot distribution processing part 37 performs nozzle ejection amount correction for each of the print data A and B, based on printing characteristics (large degree and small degree of an ejection amount) of the pair of the large and small nozzle arrays in regard to each of the print heads 71 and 72, to generate print data of each nozzle array shown in FIG. 15B. FIG. 15B shows an example where a large and small dot distribution ratio in the print head 71 is 1:1 and a large and small dot distribution ratio in the print head 72 is 1:3.

Figure 15C:
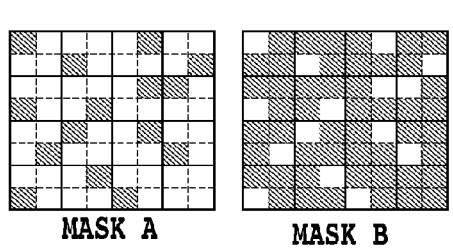
Figure 15D:
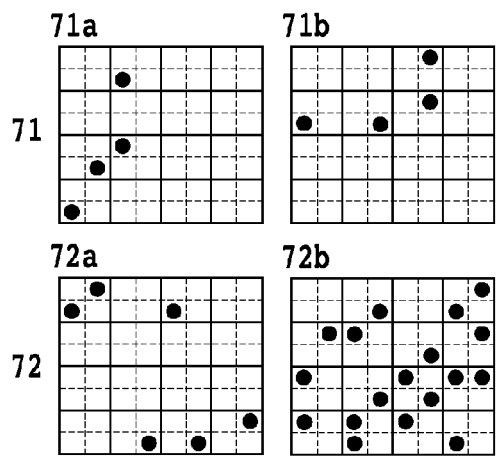

The connecting part mask processing part 38 executes the connecting process of the pair of the large and small nozzle arrays for the print data, which is obtained as described above as a result of performing the determining process of the pair of the large and small nozzle arrays and the nozzle ejection amount correction process based thereon (steps S18 and S19 in FIG. 4). In the present embodiment, the connecting process is executed for the pair of the nozzle arrays 71a and 71b and the pair of the nozzle arrays 72a and 72b, and the pair of the nozzle arrays 71c and 71d and the pair of the nozzle arrays 72c and 72d. FIG. 15C is a diagram showing a part of masks used for the connecting process. In a case of executing the connecting process for the pair of the large and small nozzle arrays 71a and 71b and the pair of the large and small nozzle arrays 72a and 72b, the mask A is used for the pair of the large and small nozzle arrays 71a and 71b, and the mask B is used for the pair of the large and small nozzle arrays 72a and 72b, obtaining print data for the connecting region (FIG. 15D). Also in regard to the pair of the nozzle arrays 71c and 71d and the pair of the nozzle arrays 72c and 72d, the determining process of the pair of the large and small nozzle arrays, the nozzle ejection amount correction process and the connecting process are likewise executed. That is, In a case of executing the connecting process for the pair of the large and small nozzle arrays 71c and 71d and the pair of the large and small nozzle arrays 72c and 72d, the mask A is used for the pair of the large and small nozzle arrays 71c and 71d, and the mask B is used to the pair of the large and small nozzle arrays 72c and 72d.

The print data for the connecting region generated as described above is used to print dots in the connecting region on the printing medium at step S20 (FIG. 4).

According to the above described embodiment, the dot arrangement that is obtained by combining the print data of the respective nozzle arrays in the pair of the nozzle arrays 71a and 71b (FIG. 15B) immediately before executing the connecting process is the same as that of the print data A shown in FIG. 15A. Also, the dot arrangement that is obtained by combining the print data of the respective nozzle arrays in the pair of the nozzle arrays 72a and 72b (FIG. 15B) is the same as that of the print data A shown in FIG. 15A. That is, in the present invention, the dot arrangements for the connecting regions, which are shown as the print data obtained by combining the print data of the respective nozzle arrays used in the connecting processes for each of the print heads, are the same in the print heads immediately before executing the connecting process.

In other words, the print data of a set of the pair of the nozzle arrays 71a and 71b and the pair of the nozzle arrays 72a and 72b, and the print data of a set of the pair of the nozzle arrays 71c and 71d and the pair of the nozzle arrays 72c and 72d are respectively based upon the print data A and the print data B shown in FIG. 15A. That is, since the print data A and the print data B have the complementary (exclusive) relation with each other, the print data of the set of the pair of the nozzle arrays 71a and 71b and the pair of the nozzle arrays 72a and 72b, and the print data of the set of the pair of the nozzle arrays 71c and 71d and the pair of the nozzle arrays 72c and 72d have the exclusive relation with each other, and the same exclusive relation between the print heads. Accordingly, the print data between the print heads in the connecting regions finally obtained via the mask process has the (same) exclusive relation with each other, and no overlap or defect of the print data occurs.

(Second Embodiment)

FIGS. 16A and 16B, FIG. 17 and FIG. 18 are diagrams explaining the configuration and the procedure of an image process, and a change of print data according to a second embodiment of the present invention, and are similar diagrams to FIGS. 3A and 3B, FIG. 4 and FIG. 15 according to the first embodiment. In the present embodiment, since the dot data generating process, the nozzle ejection amount correction and the connecting process are the same as those of the first embodiment, mainly a difference in a determining process of a pair of large and small nozzle arrays from that of the first embodiment will be herein explained.

(Determining Process of Pair of Large and Small Nozzle Arrays)

Figures 16, 16A:
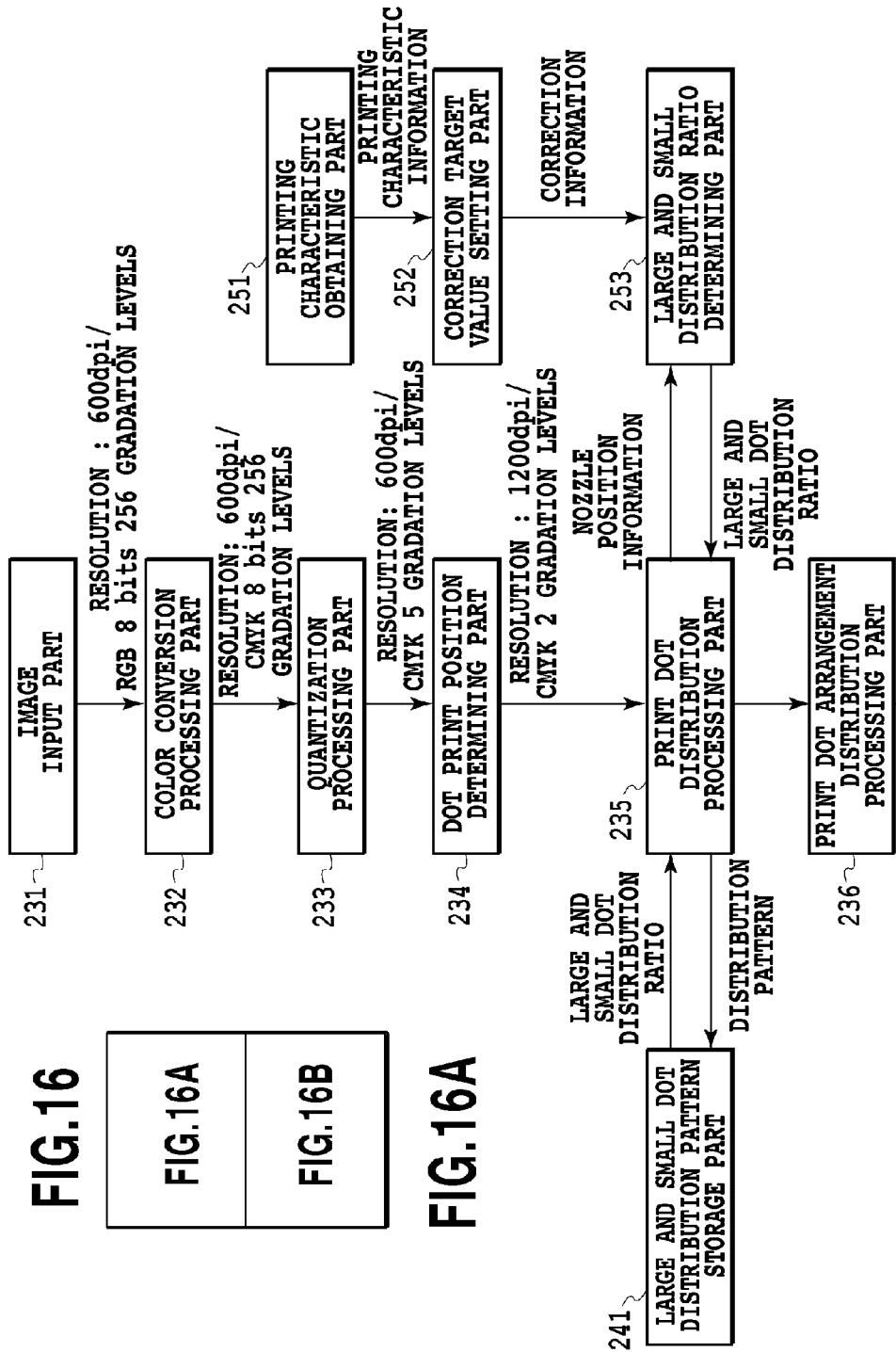
FIG. 16 is a diagram showing a relationship between FIGS. 16A and 16B, and FIGS. 16A and 16B are diagrams explaining an outline of an image process according to a second embodiment.
Figure 16B:
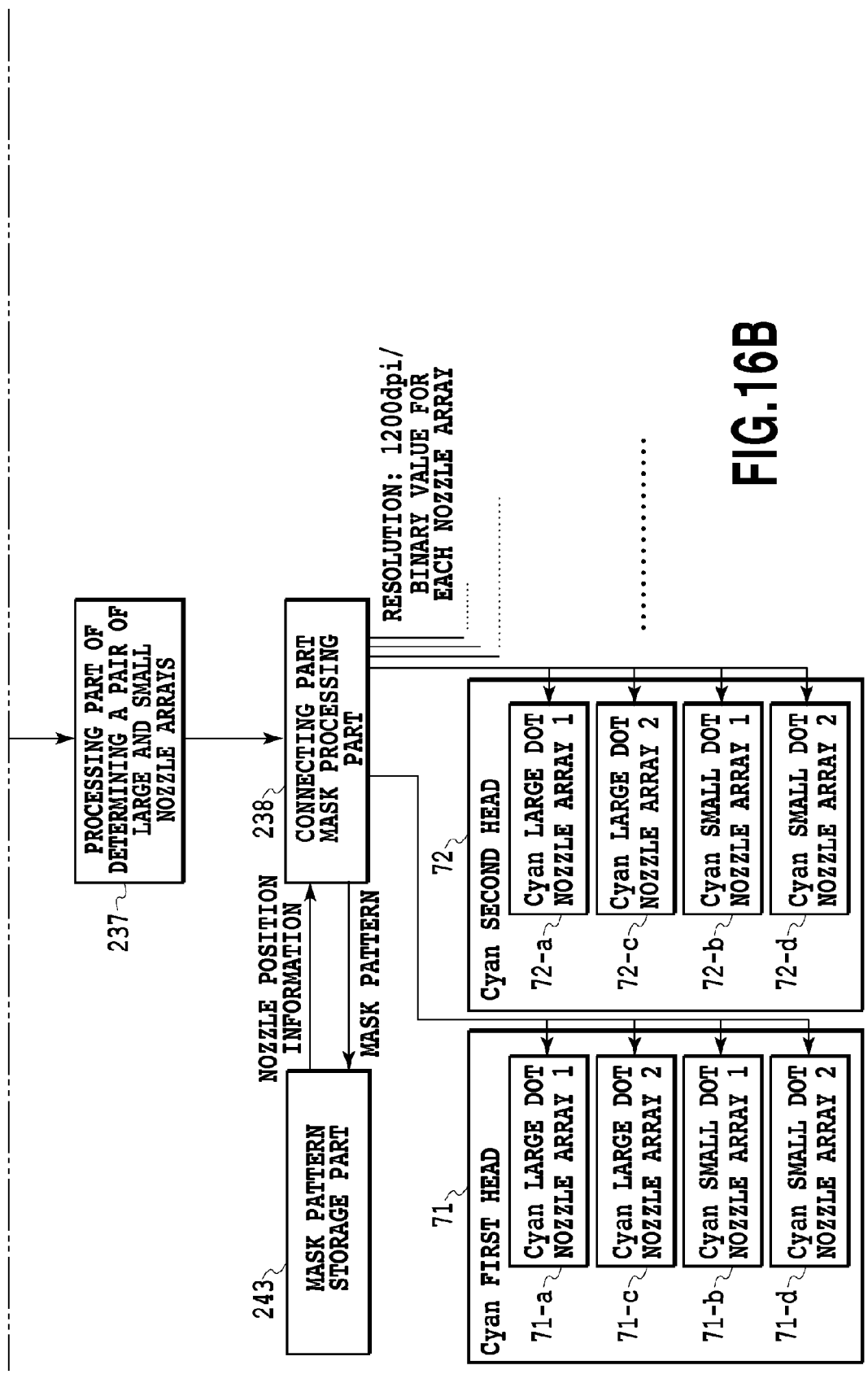
Figure 17:
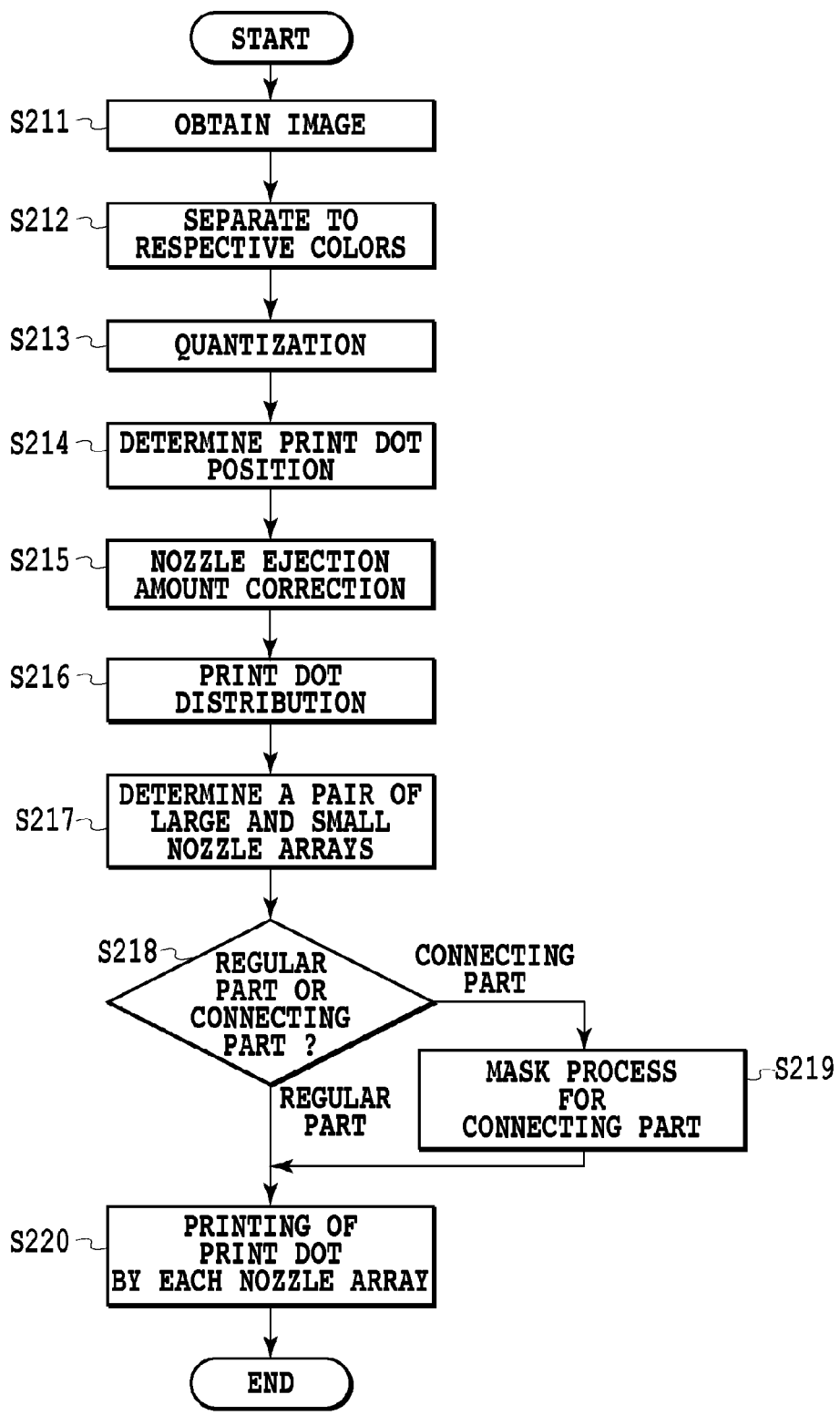
FIG. 17 is a flow chart explaining an outline of the image process according to the second embodiment.

A determining process of a pair of large and small nozzle arrays according to the present embodiment is executed by a determination processing part 237 of a pair of large and small nozzle arrays shown in FIGS. 16A and 16B at steps S216 and S217 in FIG. 17. A case of using the print heads 71 and 72 as print heads for performing the connection process will be explained as an example.

Figure 18A:
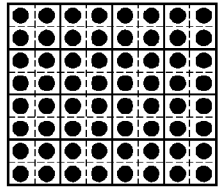
FIGS. 18A to 18C are diagrams explaining a determination on pairs of large and small nozzle arrays according to the second embodiment.
Figure 18A:
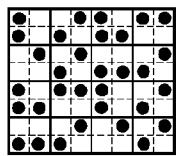
Figure 18A:
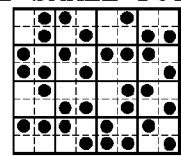
Figure 18A:
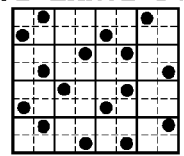
Figure 18A:
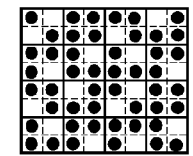

FIG. 18A shows a result obtained by causing print data (print dot arrangement in FIG. 18A) generated by a dot generating process at steps S211 to S214 to be subjected to nozzle ejection amount correction (S215) based on printing characteristics (large or small ejection amount) of the print heads 71 and 72. As similar to the first embodiment, there is shown an example where a large and small dot distribution ratio of the print head 71 is 1:1 and a large and small dot distribution ratio of the print head 72 is 1:3.

Figure 18B:
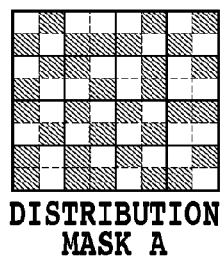
Figure 18B:
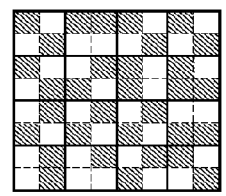
Figure 18C:
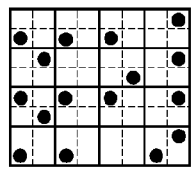
Figure 18C:
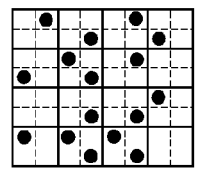
Figure 18C:
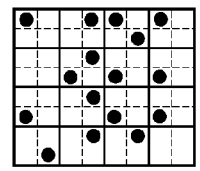
Figure 18C:
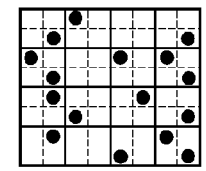
Figure 18C:
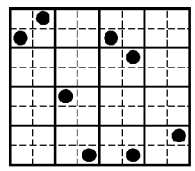
Figure 18C:
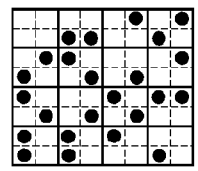
Figure 18C:
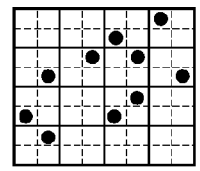
Figure 18C:
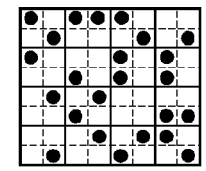

Next, a print dot arrangement distribution processing part 236 in FIGS. 16A and 16B has a plurality of distribution mask patterns (hereinafter, called a distribution mask) for distributing print dot arrangement data to a plurality of print dot arrangement data having a complementary relation with each other. In the present embodiment, two distribution masks (mask A and mask B) shown in FIG. 18B are used. The print dot arrangement distribution processing part 236 distributes each of the large and small dot print data that have been subjected to the nozzle ejection amount correction for each of the print heads 71 and 72 by using the mask A and the mask B. Then the determination processing part 237 of the pair of the large and small nozzle arrays determines a nozzle array for performing dot printing of each of the distributed print data (FIG. 18C). An operation of the distribution mask is the same as that of the mask in the connecting part.

In FIG. 18C, nozzle arrays to which print data generated by applying the distribution mask A to each of the large and small dot print data of the print head 71 (71-large dots and 71-small dots shown in FIG. 18A) are assigned are determined to be nozzle array 71a and nozzle array 71b. Nozzle arrays to which print data generated by applying the distribution mask B to each of the large and small dot print data of the print head 71 (71-large dots and 71-small dots shown in FIG. 18A) are assigned are determined to be nozzle array 71c and nozzle array 71d. Nozzle arrays for each print dot distribution data are determined also for the print head 72 in the same manner. That is, nozzle arrays to which print data generated by applying the distribution mask A to each of the large and small dot print data of the print head 72 (72-large dots and 72-small dots shown in FIG. 18A) are assigned are determined to be nozzle array 72a and nozzle array 72b. Nozzle arrays to which print data generated by applying the distribution mask B to each of the large and small dot print data of the print head 72 (72-large dots and 72-small dots shown in FIG. 18A) are assigned are determined to be nozzle array 72c and nozzle array 72d.

Next, the determination processing part 237 of a pair of large and small nozzle arrays determines large and small nozzle arrays assigned for the print data distributed by using the same mask to be set as a pair (S217). In FIG. 18C, nozzle array 71a and nozzle array 71b, nozzle array 71c and nozzle array 71d, nozzle array 72a and nozzle array 72b, and nozzle array 72c and nozzle array 72d are respectively set as a pair of large and small nozzle arrays. The connecting process is executed by using the pair of the nozzle arrays 71a and 71b and the pair of the nozzle arrays 72a and 72b, and the pair of the nozzle arrays 71c and 71d and the pair of the nozzle arrays 72c and 72d in the same way with the first embodiment.

The dot arrangement of the print data by a combination of the print data 71a and 71b and the dot arrangement of the print data by a combination of the print data 72a and 72b shown in FIG. 18C, which can be obtained as a result of the above process, are in agreement with each other. That is, also in the second embodiment, dot formation positions in the connecting regions of the print dot arrangement data by a combination of the print dot arrangement data of the nozzle arrays to be used in the connection process for the respective print heads become the same in the print heads immediately before executing the connecting process.

In other words, the print data of the set of the pair of the nozzle arrays 71a and 71b and the pair of the nozzle arrays 72a and 72b, and the print data of the set of the pair of the nozzle arrays 71c and 71d and the pair of the nozzle arrays 72c and 72d, which are used for printing in the connecting regions, have the exclusive relation with each other by the processes of the mask A and the mask B shown in FIG. 18A. Accordingly, the print data between the print heads in the connecting regions finally obtained has the exclusive relation with each other, and no overlap or defect of the print data occurs.

Other Embodiment

The present invention can be applied also to a case where the print head has two nozzle arrays shown in FIG. 8D. For example, the mask A shown in FIG. 18B is applied to print data 1-*a* of the print head 1 shown in FIG. 8B, and the mask B shown in FIG. 18B is applied to print data 1-*b* of the print head 1 shown in FIG. 8B. Likewise, the mask A is applied to print data 2-*a* of the print head 2, and the mask B is applied to print data 2-*b*. Therefore the print data between the print heads in the connecting regions finally obtained has the exclusive relation with each other, and occurrence of the overlap or defect of the print data can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-099989, filed Apr. 27, 2011, which is hereby incorporated by reference herein in its entirety.

What is claimed is:

1. An ink jet printing apparatus comprising:
    a print head unit including a plurality of print heads in each of which a first nozzle array formed by first nozzles for forming a first size of dots of ink on a print medium arranged in an array direction and a second nozzle array formed by second nozzles for forming a second size of dots of ink on the print medium arranged in the array direction are provided, wherein the second size is different from the first size and a color of the dots of the second size is the same color as the color of the dots of the first size, respective pluralities of the first and the second nozzle arrays being arranged in a direction intersecting the array direction, and different print heads being arranged so as to be shifted in the array direction so that respective parts of the plurality of first and second nozzle arrays of the different print heads print on shared print regions on the print medium;
    a first determining unit configured to determine a pixel to be formed by dot printing by one of the first nozzles provided in a print head on a predetermined area in one of the shared print regions and determine another pixel to be formed by dot printing by one of the second nozzles provided in the same print head on the predetermined area;
    a second determining unit configured to for printing on the predetermined area by the respective parts of first and second nozzle arrays of each of first and second print heads which have the shared print regions, determine a pixel to be formed by dot printing by a first set of the first and second nozzle arrays in the first print head and determine a pixel to be formed by dot printing by a second set of the first and second nozzle arrays in the second print head; and
    a print control unit configured to cause the print head unit to print dots on the predetermined area based on the determination by the first and second determining units.

2. An ink jet printing apparatus as claimed in claim 1, wherein the first determining unit determines the pixel to be formed by dot printing with the one of the first nozzles and the other pixel to be formed by dot printing with the one of the second nozzles by distributing the print data into print data for the first nozzles and for the second nozzles by using a distribution pattern defining whether printing is to be by the first nozzle or by the second nozzle for each of a plurality of pixels in the predetermined area.

3. An ink jet printing apparatus as claimed in claim 1, wherein the second determining unit determines the pixel to be formed by dot printing by the first set and the other pixel to be formed by dot printing by the second set by using a mask pattern defining whether or not to permit printing for each of a plurality of pixels in the predetermined area.

4. A print data generation method of generating print data comprising:
    providing a print head unit including a plurality of print heads in each of which a first nozzle array formed by first nozzles for forming a first size of dots of ink on a print medium arranged in an array direction and a second nozzle array formed by second nozzles for forming a second size of dots of ink on the print medium arranged in an array direction are provided, wherein the second size is different from the first size and a color of the dots of the second size is the same color as the color of the dots of the first size, respective pluralities of the first and the second nozzle arrays being arranged in a direction intersecting the array direction, and different print heads being arranged so as to be shifted in the array direction so that respective parts of the plurality of first and second nozzle arrays of the different print heads print on shared print regions on the print medium;
    a first determining step of determining a pixel to be formed by dot printing by one of the first nozzles provided in a print head on a predetermined area in one of the shared print regions and determining another pixel to be formed by dot printing by one of the second nozzles provided in the same print head on the predetermined area;
    a second determining step of, for printing on the predetermined area by the respective parts of the first and second nozzle arrays of each of first and second print heads which have the shared print regions, determining a pixel to be formed by dot printing by a first set of the first and second nozzle arrays in the first print head and determining a pixel to be formed by dot printing by a second set of the first and second nozzle arrays in the second print head; and
    a print controlling step of causing the print head unit to print dots on the predetermined area based on the determination by the first and second determining steps.

5. An ink jet printing apparatus as claimed in claim 3, wherein an arrangement of the pixels permitted to be printed by the mask pattern for the first set and an arrangement of the pixels permitted to be printed by the mask pattern for the second set are exclusive of each other.

6. An ink jet printing apparatus as claimed in claim 1, wherein the first determining unit determines the pixel to be formed by dot printing with the one of the first nozzles and the other pixel to be formed by dot printing with the one of the second nozzles, such that a ratio of the number of pixels to be formed by dot printing with the one of the first nozzles to the number of other pixels to be formed by dot printing with the one of the second nozzle for the first print head is different from the ratio for the second print head.

7. An ink jet printing apparatus as claimed in claim 1, further comprising an obtaining unit configured to obtain information relating print characteristics for the first and second print heads, wherein the first determining unit determines the pixel to be formed by dot printing by the one of the first nozzles provided in one of the print heads on the predetermined area in the shared print regions and the other pixel to be formed by dot printing by the one of the second nozzles provided in the same print head on the predetermined area based on the information obtained by the obtaining unit.

8. An ink jet printing apparatus as claimed in claim 1, wherein a diameter of the first nozzles is larger than a diameter of the second nozzles.

9. An ink jet printing apparatus as claimed in claim 1, wherein pairs of the first nozzles and the second nozzles in the same print head are capable of forming a pixel with respective dots at the same position on the print medium.

10. A print data generation method as claimed in claim 4, wherein the first determining step determines the pixel to be formed by dot printing with the one of the first nozzles and the other pixel to be formed by dot printing with the one of the second nozzles by distributing the print data into print data for the first nozzles and for the second nozzles by using a distribution pattern defining whether printing is to be by the first nozzle or by the second nozzle for each of a plurality of pixels in the predetermined area.

11. A print data generation method as claimed in claim 4, wherein the second determining step determines the pixel to be formed by dot printing by the first set and the other pixel to be formed by dot printing by the second set by using a mask pattern defining whether or not to permit printing for each of a plurality of pixels in the predetermined area.

12. A print data generation method as claimed in claim 11, wherein an arrangement of the pixels permitted to be printed by the mask pattern for the first set and an arrangement of the pixels permitted to be printed by the mask pattern for the second set are exclusive of each other.

13. A print data generation method as claimed in claim 4, wherein the first determining unit determines the pixel to be formed by dot printing with the one of the first nozzles and the other pixel to be formed by dot printing with the one of the second nozzles, such that a ratio of the number of pixels to be formed by dot printing with the one of the first nozzles to the number of other pixels to be formed by dot printing with the one of the second nozzles for the first print head is different from the ratio for the second print head.

14. A print data generation method as claimed in claim 4, further comprising an obtaining step of obtaining information relating print characteristics for the first and second print heads,
wherein the first determining step determines the pixel to be formed by dot printing by the one of the first nozzles provided in one of the print heads on the predetermined area in the shared print regions and the other pixel to be formed by dot printing by the one of the second nozzles provided in the same print head on the predetermined area based on the information obtained by the obtaining unit.

15. A print data generation method as claimed in claim 4, wherein a diameter of the first nozzles is larger than a diameter of the second nozzles.

16. A print data generation method as claimed in claim 4, wherein pairs of the first nozzles and the second nozzles in the same print head are capable of forming a pixel with respective dots at the same position on the print medium.

\* \* \* \* \*